US006628579B2

(12) United States Patent
Watanabe et al.

(10) Patent No.: US 6,628,579 B2
(45) Date of Patent: *Sep. 30, 2003

(54) STORAGE APPARATUS

(75) Inventors: Ichiro Watanabe, Kawasaki (JP); Takayuki Kawabe, Kawasaki (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/454,627

(22) Filed: Dec. 6, 1999

(65) Prior Publication Data

US 2003/0072226 A1 Apr. 17, 2003

(30) Foreign Application Priority Data

Dec. 24, 1998 (JP) .......................... 10-366326
Mar. 19, 1999 (JP) .......................... 11-075043
Oct. 29, 1999 (JP) .......................... 11-308244

(51) Int. Cl.$^7$ ........................................ G11B 7/00
(52) U.S. Cl. .................. 369/44.28; 369/44.34; 360/77.04; 360/78.07
(58) Field of Search .................. 369/44.28, 44.29, 369/44.35, 44.34, 30.1, 30.11, 30.12, 30.13, 30.15, 30.17; 360/78.05, 78.07, 78.09, 77.04, 77.02, 77.03

(56) References Cited

U.S. PATENT DOCUMENTS

| | | | |
|---|---|---|---|
| 4,616,276 A | 10/1986 | Workman | 360/77 |
| 4,866,688 A | * 9/1989 | Ohtake et al. | 369/44.28 |
| 5,065,263 A | 11/1991 | Yoshida et al. | 360/77.03 |
| 5,072,318 A | * 12/1991 | Yu | 360/77.02 |
| 5,268,834 A | 12/1993 | Sanner et al. | 364/151 |
| 5,559,768 A | 9/1996 | Ito et al. | 369/44.25 |
| 5,608,586 A | 3/1997 | Sri-Jayantha et al. | 360/77.04 |
| 5,677,809 A | * 10/1997 | Kadlec | 360/77.07 |
| 5,898,286 A | * 4/1999 | Clare et al. | 360/78.09 |
| 6,118,739 A | * 9/2000 | Kishinami et al. | 369/44.28 |

FOREIGN PATENT DOCUMENTS

| | | |
|---|---|---|
| JP | 59060740 | 4/1984 |
| JP | 62183040 | 8/1987 |
| JP | 02108286 | 4/1990 |
| JP | 08077589 | 3/1996 |

OTHER PUBLICATIONS

Tomizuka et al.; "Analysis and Synthesis of Discrete–Time Repetitive Controllers", *Journal of Dynamic Systems, Measurement and Control*; Sep. 1989, vol. 111; pp. 353–358.
Kempf et al; "Comparison of Four Discrete–Time Repetitive Algorithms", *IEEE Control Systems*; Dec. 1993; pp. 48–54.
Sanner et al.; "Gaussian Networks for Direct Adaptive Control"; *IEEE Trans. Neurol Networks*; vol. 3, No. 6, Nov. 1992; pp. 837–863.

* cited by examiner

*Primary Examiner*—Thang V. Tran

(57) ABSTRACT

A learning control unit is provided between a feedback calculating unit and a driving unit. When a period for one medium rotation period is assumed to be $T_L$, an unknown drive current function Irepeat(t) which repeats for a period of time from a start time t=0 for one medium rotation period to an end time $t=T_L$ is obtained by a learning algorithm as an approximated function I^repeat(t) that is approximately presumed by a set of the heights $C_i$ of N rectangular functions having interval numbers i=0~ (N−1) whose time widths are obtained by dividing the period for one medium rotation period into N intervals. After the learning, a learning control signal I^repeat is outputted synchronously with the medium rotation and a feed-forward control is performed. The learning control unit can be provided between a position signal detecting unit and a feedback calculating unit and can learn a position function TESrepeat(t) as an approximated function TES^repeat(t) in a similar manner.

12 Claims, 25 Drawing Sheets

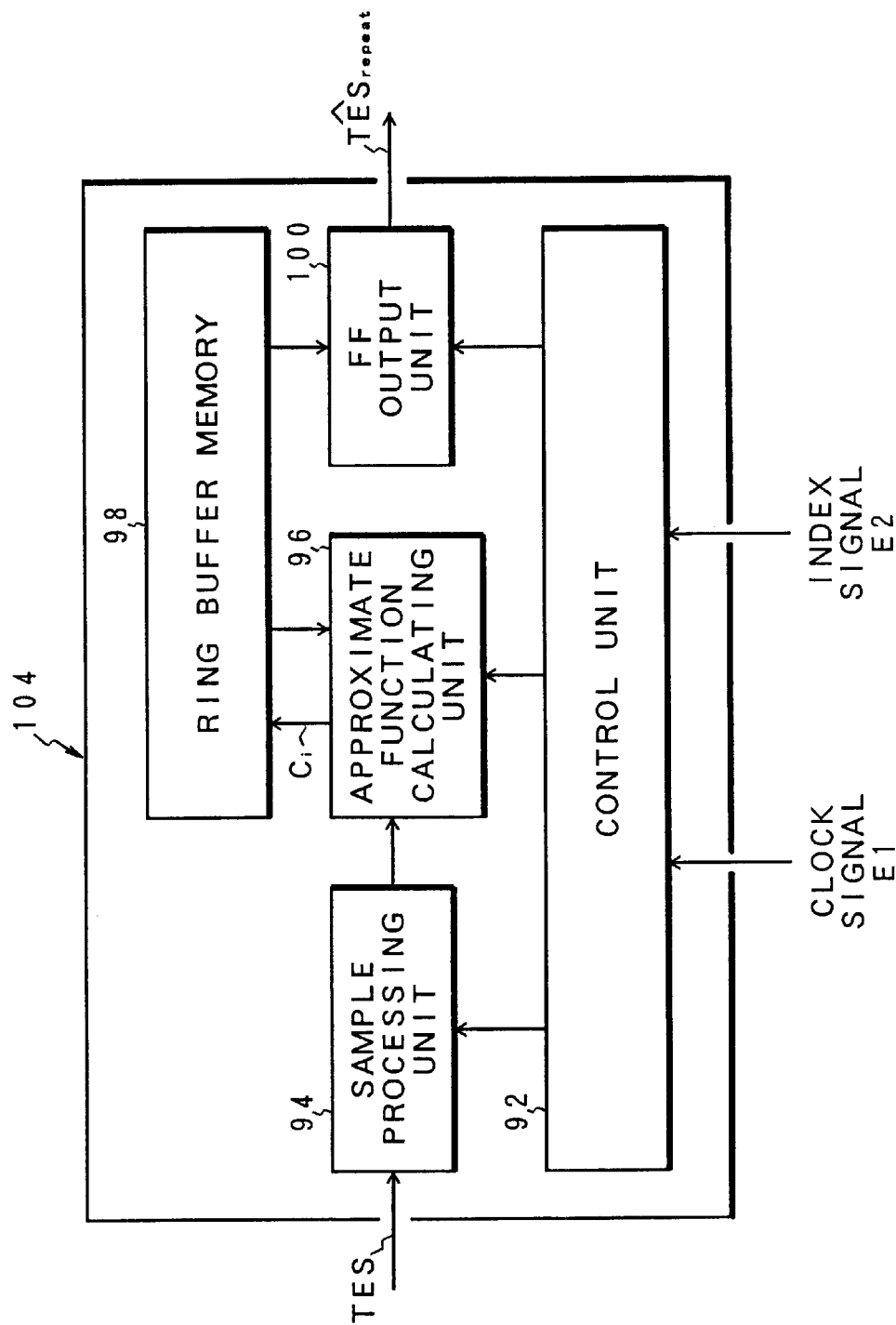

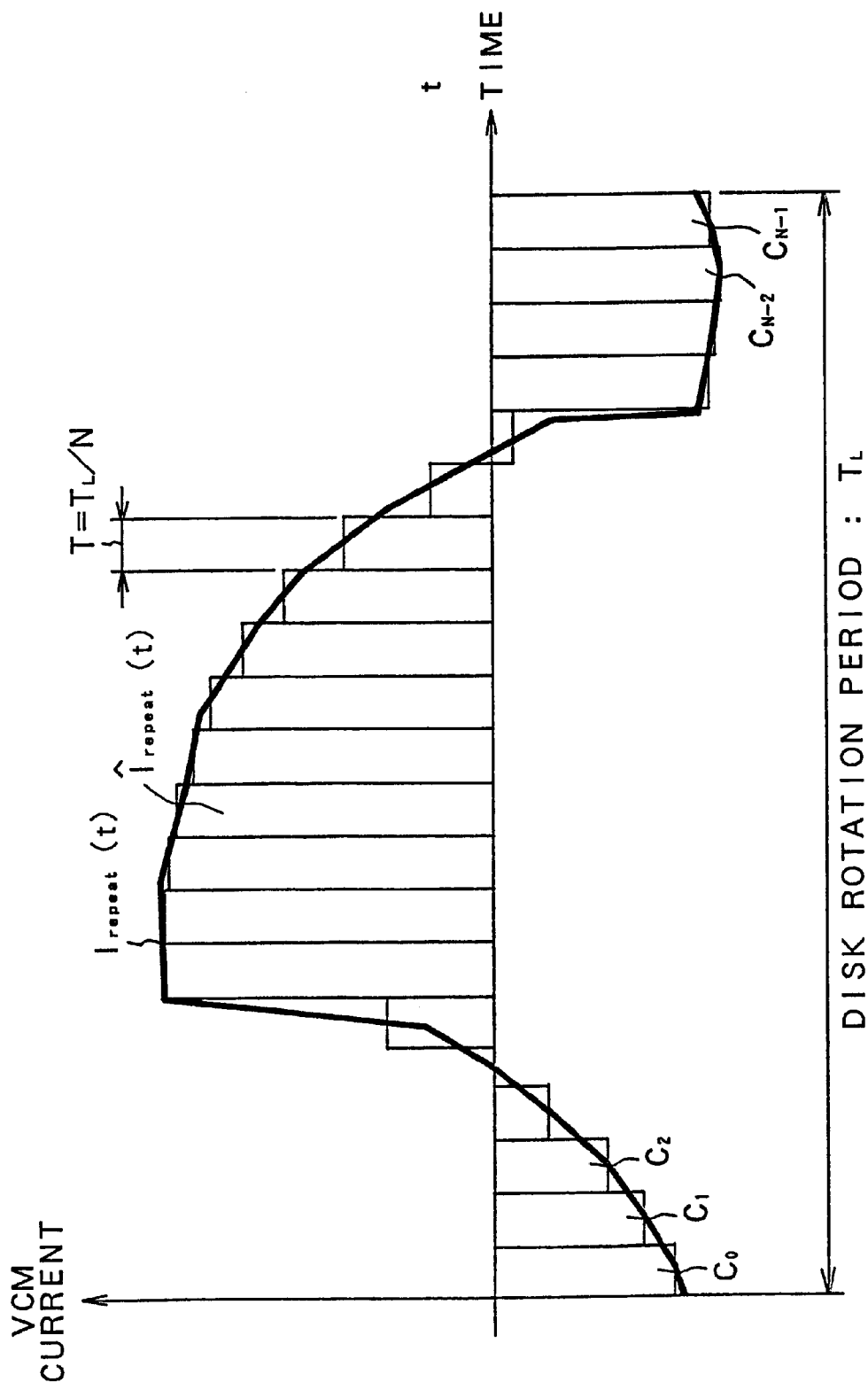

$X_{RO}$ : DISPLACEMENT OF TRACK DUE TO MEDIUM ECCENTRICITY
X : CARRIAGE DISPLACEMENT
e : TRACKING ERROR (TES)
$I_{FB}$ : OUTPUT OF FEEDBACK CONTROLLER
$I_{FF}$ : FEED-FORWARD SIGNAL (OUTPUT OF LEARNING CONTROLLER)
I : CARRIAGE DRIVE SIGNAL (VCM DRIVE SIGNAL)

STORAGE APPARATUS

BACKGROUND OF THE INVENTION

1. Field of the Invention

The invention relates to a storage apparatus for feedback controlling a moving position of a carriage so as to set a positional deviation amount of a head from a track center to zero and, more particularly, to a storage apparatus for obtaining a control signal to suppress a positional deviation of a repetitive disturbance such as a medium eccentricity by a learning control and performing a feed-forward control.

2. Description of the Related Arts

In a conventional optical disk apparatus, to raise track-following performance of a laser beam to medium tracks, there is used a head mechanism of a double driving type comprising: a carriage actuator for a seek control (also referred to as a coarse control) for moving a carriage supported by a bearing unit for a guide rail fixedly arranged; and a tracking actuator for a track-following control (also referred to as a fine control) for moving the laser beam in the direction which transverses the tracks by the driving of an objective lens mounted on the carriage. In recent years, there has also widely been spread a head mechanism of a single driving type comprising only the carriage actuator by omitting the tracking actuator in order to reduce the costs of the apparatus. In the head mechanism of the single driving type, a slide bearing is employed replacing the ball bearing, thereby reducing the number of parts and the costs. However, in case of constructing the head mechanism as a mechanism of the single driving type comprising only the carriage actuator and, further, removing the ball bearing from the bearing unit of the carriage, a positioning control of the laser beam for the track center based on a tracking error signal is strongly influenced by a Coulomb friction which the carriage bearing unit has.

FIG. 1 shows characteristics of the Coulomb friction in the carriage of the single driving type. Each of a moving velocity V and a frictional force F has a plus or minus value according to the moving direction of the carriage. A case where the moving velocity V of the carriage changes from the minus value to the plus value will now be considered. While the carriage is moving at the moving velocity V having the minus value, an almost constant kinetic frictional force F1 of a plus value is generated against the moving velocity. When the moving velocity V of the carriage for the guide rail is equal to 0 and, subsequently, the carriage starts to move in the opposite direction, a driving force canceling a static frictional fore -F2 is needed and, after moving, the driving force should include a force canceling an almost constant kinetic frictional force -F1. At the time of the reversal of the moving velocity of the carriage as mentioned above, a steep force change of the frictional force acts as a disturbance on a control system. To sufficiently compensate the disturbance, a feedback control system with a high bandwidth is generally necessary. The reversal of the moving velocity of the carriage occurs, for example, in a track-following control to compensate for a repetitive positional deviation of the track due to an eccentricity of the medium. That is, when the carriage is controlled so as to trace the medium eccentricity, the motion of the carriage for the guide rail becomes a reciprocating motion synchronized with an eccentricity period. Therefore, the moving velocity of the carriage is reversed at least twice for one rotation of the medium and is subjected to the disturbance by the steep force change of the frictional force each time.

FIG. 2 shows a simulation result of a tracking error signal TES for a rotational period (time) when an on-track control is performed by a feedback control system to a head mechanism of a single driving type. In such a simulation, a track pitch is set to 1.1 $\mu$m, a rotational speed of the disk is set to 3600 rpm, and a coefficient $\mu$ of friction is set to 0.3. A band of the feedback control system is set to 1.5 kHz in consideration of a high-order resonance having a higher resonance at about 15 kHz of the actual head mechanism. A waveform 200 relates to a case where a peak-to-peak amount of eccentricity is assumed to be 50 $\mu$m. A waveform 202 relates to a case where a peak-to-peak amount of eccentricity is assumed to be 20 $\mu$m. A waveform 204 relates to a case where a peak-to-peak amount of eccentricity is assumed to be 10 $\mu$m. With respect to any of the waveforms 200, 202, and 204 as well, the eccentricity disturbance cannot be sufficiently suppressed due to deterioration of low band error compressing performance and reduction of a control band of the feedback control system due to the single driving of the head mechanism. The waveforms are also influenced by the steep change of the frictional disturbance occurring at a point when the moving velocity is equal to 0 when the carriage is allowed to trace the eccentricity, so that large peak-like tracking errors 206-1, 206-2, 206-3, and 206-4 occur. If a Coulomb friction $F_{fric}$ in association with the movement of the carriage is simply expressed by omitting a static friction, it is modeled by the following equation.

$$F_{fric} = \begin{cases} -\mu mg, & \dot{x} \geq 0 \\ \mu mg, & \dot{x} < 0 \end{cases} \quad (1)$$

As will be obviously understood from such a model, a cause of difficulty of the compensation by the feedback control is considered because the sign of the Coulomb friction $F_{fric}$ suddenly changes, for example, from the minus value to the plus value at the time of reversal of a velocity $\dot{x}$ of the carriage for the guide tail.

Although a method of raising the band of the feedback control system is generally considered as a method of compensating for such a steep frictional disturbance, there is a limitation due to the existence of the high-order mechanical resonance near 15 kHz. Further, since the track-following control is performed by the carriage driving and the driving by the lens actuator is omitted, it is difficult to sufficiently raise the control band for positioning.

SUMMARY OF THE INVENTION

According to the invention, there is provided a storage apparatus in which by combining a feedback control system and a learning control system, a steep frictional disturbance due to a medium eccentricity is certainly compensated for, and a tracking error is reduced.

First, a storage apparatus of the invention, for example, an optical storage apparatus comprises: a head having a carriage for moving an irradiating position of a laser beam onto an arbitrary track position on a medium; a position signal detecting unit (tracking error detecting unit) for detecting and generating a position signal (tracking error signal) TES according to a positional deviation amount in which a predetermined position of a track on the medium is used as a reference on the basis of the light derived from the medium in accordance with an irradiation of the laser beam; a feedback calculating unit for inputting the position signal TES and calculating a control signal (control current) $I_{FB}$ to move the carriage of the head so as to set the positional deviation amount to zero; and a driving unit (VCM) for driving the carriage of the head so that the irradiating position of the laser beam traces the track on the basis of the control signal $I_{FB}$ of the feedback calculating unit. With respect to such a storage apparatus, the invention is characterized by comprising a learning control unit for getting an unknown function for one medium rotation to set the positional deviation amount for the repetitive disturbance to zero as an approximated function which was approximately presumed by a learning algorithm and storing it. More specifically speaking, according to the learning control unit, the unknown function for one medium rotation period to set the positional deviation amount for the repetitive disturbance such as a medium eccentricity synchronized with the medium rotation to zero is obtained by a learning algorithm as an approximated function which was approximately presumed by a set of heights of N rectangular functions which a time width of each rectangular function is obtained by dividing the time for one medium rotation period into N intervals and stored. According to the learning control unit, even if it takes a slightly long time to converge the learning result due to a low learning gain, a compensation signal of a steep frictional disturbance with a high bandwidth in association with the reverse in the carriage moving direction can be also included in the learning result that is finally obtained. By adding such a learning control signal to a feedback control signal as a feed-forward compensation signal, the steep frictional disturbance can be almost cancelled. Since the single driving type carriage is used, there is a limitation due to the existence of the high-order mechanical resonance. Even if the control band is low, a tracking error for the eccentricity of the medium is remarkably reduced and the precision of the on-track control can be improved.

The learning control unit of the invention is provided between the feedback calculating unit and the driving unit. Assuming that the time for one medium rotation period is set to $T_L$, an unknown drive current function Irepeat(t) (where, $0 \leq t < T_L$; $T_L$ denotes one medium rotation period) which is repeated for a period of time from a start time t=0 for one medium rotation period to an end time t=$T_L$ is obtained by a learning algorithm as an approximated function I^repeat(t) (where, $0 \leq t < T_L$; $T_L$ denotes the one medium rotation period) which is approximately presumed by a set of heights of N rectangular functions indexed from 0 to (N-1), obtained by dividing the time $T_L$ for one medium rotation period into N intervals and stored. Although the approximated function is expressed by I^repeat it is expressed as "I^repeat" in the specification. This expression is also similarly applied to an approximated function "TES^repeat".

When the learning control unit is provided between the feedback calculating unit and the driving unit as mentioned above, since the learning of the drive current of the feedback control system is performed, a learning result of small noises is obtained. The learning result can be directly used as a feed-forward current at the time of a seek control, a kickback, or the like after the learning. The control is simpler and more certain because the conversion of the learning result is unnecessary.

The learning control unit comprises a memory, a sampling unit, an approximated function calculating unit, and a feed-forward output unit. The memory has a plurality of memory cells to store the height $C_i$ of each rectangular function of the approximated function I^repeat(t). The sampling unit samples the control signal $I_{FB}$ which is outputted from the feedback calculating unit. The approximated function calculating unit obtains the height $C_i$ of each, rectangular function of the approximated function I^repeat(t) stored in each memory cell of the memory by the following learning law.

$$C_i = \text{Klearn} \times I_{FB}$$

where, i denotes the index number of the rectangular function which is decided by time t and $0 \leq i \leq (N-1)$;

for example, i=floor(t/T), where T=$T_L$/N on the basis of the control signal $I_{FB}$ sampled by a sampling unit and a predetermined learning gain Klearn and updates the height $C_i$.

A feed-forward output unit (FF output unit) reads out the height $C_i$, as a learning control signal, of each rectangular function of the approximated function I^repeat(t) stored in the memory cell of the memory synchronously with the divisional period T of the medium rotation, adds it to the control signal $I_{FB}$ from the feedback calculating unit, and supplies a drive signal $I_{VCM}$ to the driving unit.

In more detail, the sampling unit samples the control signal $I_{FB}$ at a predetermined period Tsample shorter than or equal to the divisional period T, and the approximated function calculating unit obtains the height $C_i$ of each rectangular function of the approximated function I^repeat(t) stored in each memory cell of the memory by the following equation $$C_i^{new} = C_i^{last} + K_{learn} \cdot T_{sample} \cdot I_{FB}(t)$$

where, i denotes the number of the interval which is decided by a time t and $0 \leq i \leq (N-1)$;

for example, i=floor(t/T)

on the basis of the control signal $I_{FB}$ sampled by the sampling unit and a predetermined learning gain Klearn and updates the height $C_i$. $C_i^{last}$ denotes a value of $C_i$ before the updating and $C_i^{new}$ denotes a value of $C_i$ after the updating. In the equation, for example, $C_i$ to be updated at present time t is selected on the basis of a calculation result of i by i=floor(t/T). An integrating arithmetic operation which inputs $I_{FB}(t)$ is performed to the $C_i$ value ($C_i^{last}$) of one sample before (before $T_{sample}$ time), thereby obtaining an updating result ($C_i^{new}$) of the $C_i$ value at the present time t. The height $C_i$ of rectangular function having an index number other than i calculated by i=floor(t/T) is not updated (namely, in this case, $C_i^{new} = C_i^{last}$). The above processes are summarized as follows.

$$\begin{cases} C_i^{new} = C_i^{last} + K_{learn} \cdot T_{sample} \cdot I_{FB}(t), \\ \text{for } i \text{ which is calculated by} \\ i = \text{floor}(t/T) \\ C_i^{new} = C_i^{last}, \text{ for the other } i \end{cases}$$

Further, synchronously with the medium rotation, a feed-forward output unit reads out the height $C_i$ of each rectangular function of the approximated function I^repeat(t) stored in the memory cell of the memory synchronously with the sampling period Tsample, adds it to the control signal $I_{FB}$ from the feedback calculating unit, and supplies a drive signal $I_{VCM}$ to the driving unit. The feed-forward output unit reads out the value of the approximated function I^repeat(t) stored in each memory cell of the memory corresponding to the time that is advanced by a predetermined time Δtlead and outputs it. The learning control unit repeats the learning while feed-forward outputting the learning result at this time point. It this case, there is a time delay such as a phase delay or the like in the feedback control system. Unless it is compensated, the control becomes unstable. Therefore, with respect to the latest learning result I^repeat(t) at that time point, the value corresponding to the time that is advanced from the present time by the predetermined time Δtlead is read out and outputted, so that the learning can be performed in a state where the control system is stable.

In another embodiment of the invention, the learning control unit is provided between the position signal detecting unit and the feedback calculating unit. Assuming that the time corresponding to one medium rotation is equal to $T_L$, an unknown position function TESrepeat(t) (where, $0 \leq t < T_L$; $T_L$ denotes the period for one medium rotation period) which repeats for a period of time from the start time t=0 to the end time $t=T_L$ of the one medium rotation is obtained by a learning algorithm as an approximated function TES^repeat (t) (where, $0 \leq t < T_L$; $T_L$ denotes the period for one medium rotation period) which is approximately presumed by the height $C_i$ (where, i is the index number; $0 \leq i \leq (N-1)$) of each rectangular function having the index number i obtained by dividing the time $T_L$ for one medium rotation period into N intervals and is stored. The learning control unit has a memory, a sampling unit, an approximated function calculating unit, and a feed-forward output unit. The memory has a plurality of memory cells to store the height $C_i$ of each: rectangular function of the approximated function TES^repeat(t). The sampling unit samples the position signal TES which is outputted from the position signal detecting unit. The approximated function calculating unit obtains the height $C_i$ of each rectangular function of the approximated function TES^repeat(t) stored in each memory cell of the memory by the following equation $$\dot{C}_i = Klearn \cdot TES(t)$$

where, i denotes the index number of the interval which is decided by time t and $0 \leq i \leq (N-1)$;

for example, i=floor(t/T), $T = T_L/N$ on the basis of the position signal TES sampled by the sampling unit and the predetermined learning gain Klearn and updates the height $C_i$. Synchronously with the medium rotation, the feed-forward output unit reads out the height $C_i$ of each rectangular function of the approximated function TES^repeat(t) stored in the memory cell synchronously with the divisional period T of the medium rotation, adds it to the position signal TES from the position signal detecting unit, and supplies a feedback signal $TES_{FB}$ to the feedback calculating unit. Explaining in more detail, the sampling unit samples the position signal TES at a predetermined period Tsample shorter than or equal to the divisional period T. The approximated function calculating unit obtains the height $C_i$ of each rectangular function of the approximated function TES^repeat(t) stored in each memory cell of the memory by the following equation $$C_i^{new} = C_i^{last} + K_{learn} \cdot T_{sample} \cdot TES(t)$$

where, i denotes the number of the interval which is decided by time t and $0 \leq i \leq (N-1)$;

for example, i=floor(t/T)

on the basis of the control signal $I_{FB}$ sampled by the sampling unit and a predetermined learning gain Klearn and updates the height $C_i$. $C_i^{last}$ denotes a value of $C_i$ before the updating and $C_i^{new}$ denotes a value of $C_i$ after the updating.

In the equation, for example, $C_i$ to be updated at present time t is selected on the basis of a calculation result of i by i=floor(t/T). An integrating arithmetic operation which inputs TES(t) is performed to the $C_i$ value ($C_i^{last}$) of one sample before (before $T_{sample}$ time), thereby obtaining an updating result ($C_i^{new}$) of the $C_i$ value at the present time t. The height $C_i$ of rectangular function having an index number other than i calculated by i=floor(t/T) is not updated (namely, in this case, $C_i^{new} = C_i^{last}$). The above processes are summarized as follows.

$$\begin{cases} C_i^{new} = C_i^{last} + K_{learn} \cdot T_{sample} \cdot TES(t), \\ \text{for } i \text{ which is calculated by} \\ i = \text{floor}(t/T) \\ C_i^{new} = C_i^{last}, \text{ for the other } i \end{cases}$$

Further, synchronously with the medium rotation, a feed-forward output unit reads out the height $C_i$ of each rectangular function of the approximated function TES^repeat(t) stored in the memory cell synchronously with the sampling period Tsample, adds it to the position signal TES from the position signal detecting unit, and supplies a feedback signal $TES_{FB}$ to the feedback calculating unit. In this case as well, the feed-forward output unit reads out the value of the approximated function TES^repeat(t) stored in each memory cell of the memory corresponding to the time that is advanced by the predetermined time Δtlead and outputs it.

The learning control unit outputs the approximated function I^repeat(t) or TES^repeat(t) obtained by the learning algorithm after the learning synchronously with the medium rotation, thereby performing a feed-forward control. The learning control unit feed-forward controls such that an operation to obtain an approximated function by the learning algorithm is performed for a specific time at a timing just: after the medium was inserted into the apparatus and, at the time of a track-following control after the learning, the obtained approximated function is outputted synchronously with the medium rotation and the: repetitive disturbance is removed. The learning control unit also feed-forward controls such that, at the time of the track jump and the seek control after the learning, the obtained approximated function is outputted synchronously with the medium rotation and the repetitive disturbance is removed.

In the storage apparatus, when the approximated function is obtained by learning at a specific position in the disk radial direction, for example, at a position near the center region on the disk, in the case where a pickup is sought and moved to another radial direction position and the track-following control is performed, there is a situation such that an error occurs so long as the obtained approximated function is used, so that the approximation is inadequate. For example, when circularity at the inner region of the track on the disk and that at the outer region on the disk are different, when a difference between the phases or amplitudes of the repetitive disturbance in association with the spindle rotation in the inner region and the outer region cannot be ignored, or when a pickup having a structure of a mechanism of the single driving type is used, there is a situation such that magnitudes of friction in the inner region and the outer region differ. Therefore, in the learning control unit of the invention, the getting operation of the approximated function is performed at a plurality of positions in correspondence to the radial direction position of the disk. In the feed-forward mode, the approximated function is selected in accordance with the track address where the pickup is on-tracked at that time (for example, the approximated function obtained by the learning in the nearest track address is selected) and the feed-forward is performed, so that the high precise track-following control can be realized irrespective of the track address to be on-tracked. In the case where the getting operation of the approximated function is performed at a plurality of positions as mentioned above, there is hardly difference among the basic waveforms of the approximated functions and differences among the approximated functions are fine differences. Therefore, when there is approximated function data at another position, an initial value (initial value of the cell corresponding to the height of each rectangular function) of the approximated function data in the approximated function getting operation at the present position is not started from zero but is started by using the approximated function data at another position as an initial value, thereby enabling the learning time to be reduced. In case of the optical storage apparatus, for example, the head has a structure of the single driving type such that the objective lens is mounted onto the carriage that is freely movable in the direction which transverses the tracks on the medium in a manner such that the focusing control can be freely performed, and both the track-following control for allowing the laser beam to trace the track by the movement of the carriage and the seek control for moving the laser beam onto an arbitrary track position are performed.

The above and other objects, features, and advantages of the present invention will become more apparent from the following detailed description with reference to the drawings.

BRIEF DESCRIPTION OF THE DRAWINGS

FIG. 19 is a functional block diagram of the learning control unit in FIG. 18;

FIGS. 24A and 24B are explanatory diagrams of a principle of an approximating method of an unknown function and a constructional principle of a control system according to the invention.

DETAILED DESCRIPTION OF THE PREFERRED EMBODIMENTS

Figure 3A:
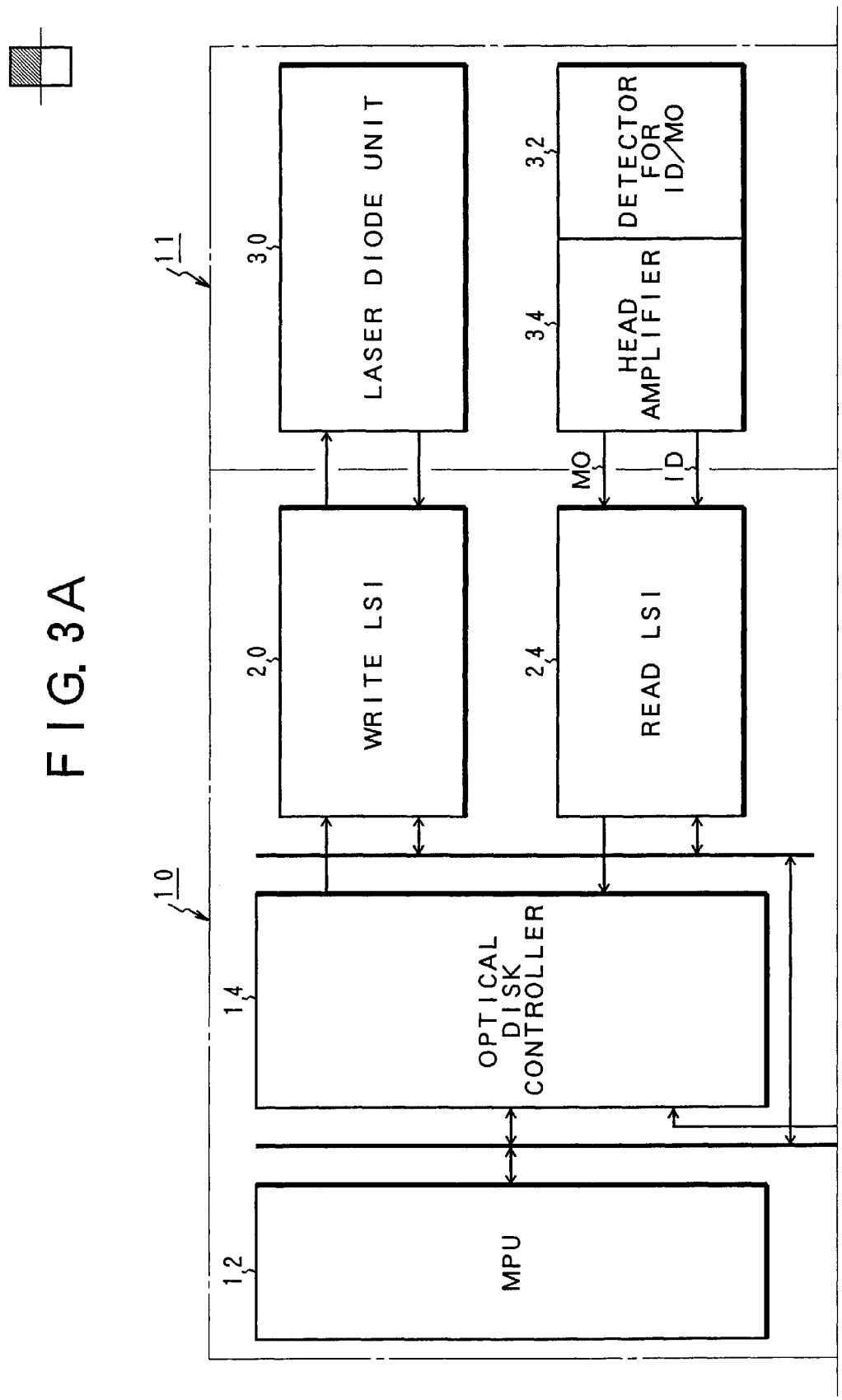
FIGS. 3A and 3B are block diagrams of an optical disk drive to which the invention is applied.
Figure 3B:
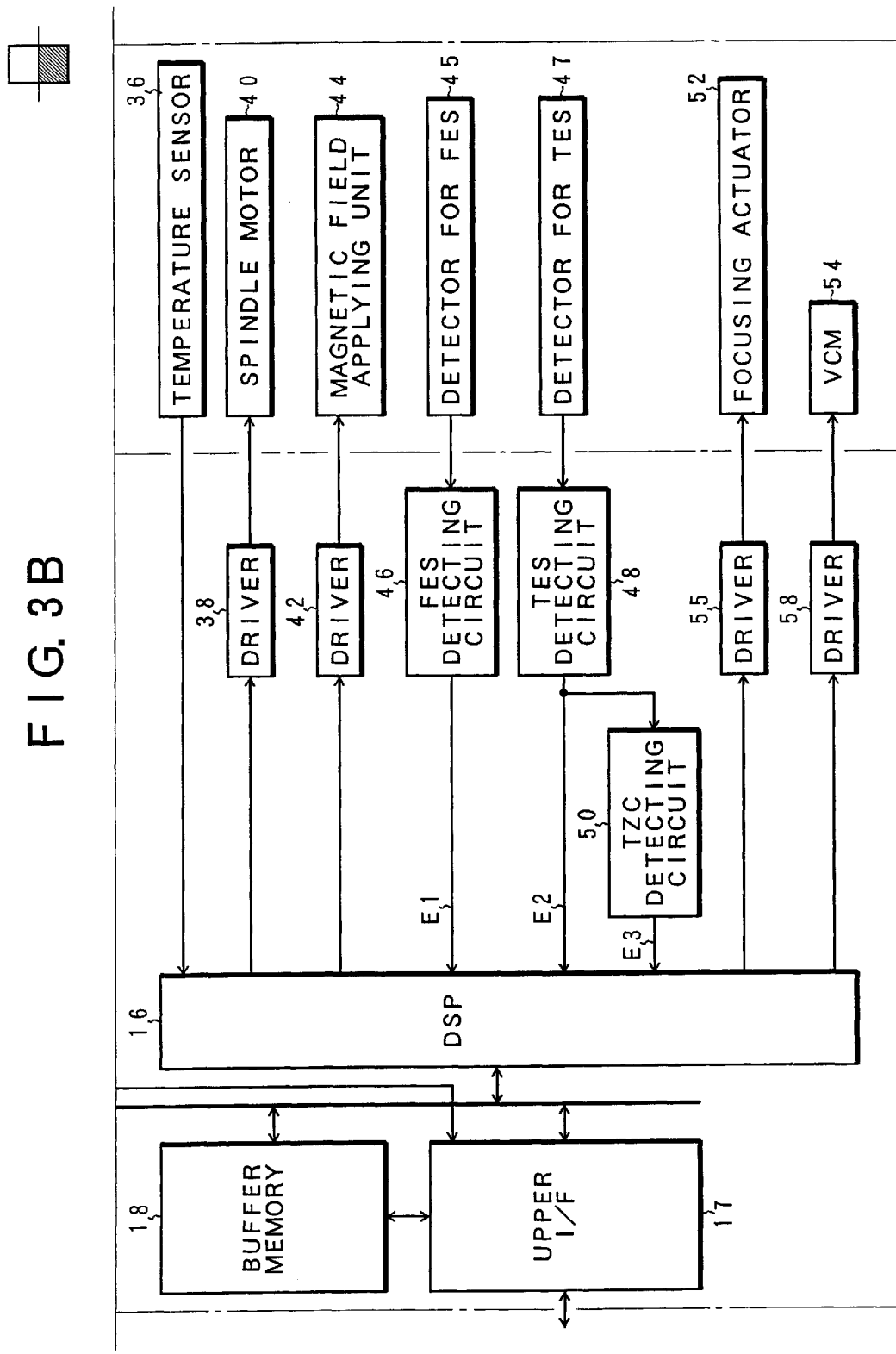

FIGS. 3A and 3B show a storage apparatus of the invention and relates to an optical disk drive. as an example. The optical disk drive of the invention is constructed by a control unit 10 and an enclosure 11. The control unit 10 has: an MPU 12 to perform a whole control of the optical disk drive; an upper interface 17 to transmit and receive commands and data to/from an upper apparatus; an optical disk controller (ODC) 14 to perform processes necessary to read and write data from/to an optical disk medium; a DSP 16; and a buffer memory 18. The buffer memory 18 is used in common by the MPU 12, optical disk controller 14, and upper interface 17. A formatter and an ECC unit are provided for the optical disk controller 14. At the time of a write access, the formatter divides NRZ write data on a sector unit basis of the medium and forms a recording format, and the ECC unit forms an ECC code on a sector write data unit basis and adds it and, if necessary, forms a CRC code and adds it. Further, sector data which was ECC encoded is converted into, for example, a 1-7 RLL code. At the time of a read access, sector read data is 1-7 RLL inversely converted and subsequently CRC checked by the ECC unit and, thereafter, is subjected to error detection and correction. Further, the NRZ data of the sector unit is coupled by the formatter and transferred to the upper apparatus as a stream of NRZ read data. A write LSI 20 is provided for the optical disk controller 14. A write modulating unit and a laser diode control unit are provided for the write LSI 20. A laser diode unit 30 has a laser diode and a detector for monitoring. The write LSI 20 converts write data into data of a data format in the PPM recording or PWM recording (also referred to as a mark recording or edge recording). As an optical disk to which the recording and reproduction are performed by using the laser diode unit 30, namely, a rewritable MO cartridge medium, any of media of 128 MB, 230 MB, 540 MB, 640 MB, 1.3 GB, and the like can be used. Among them, with respect to the MO cartridge medium of 128 MB, the pit position recording (PPM recording) in which data is recorded in correspondence to the presence or absence of a mark on the medium is used. A recording format of the medium is a zone CAV and the number of zones of a user area is equal to 1 in case of the 128 MB medium. As for the MO cartridge media of 230 MB, 540 MB, 640 MB, and 1.3 GB corresponding to the high density recording, the pulse width recording (PWM recording) in which edges of a mark, namely, the front edge and the rear edge are made correspond to data is used. A difference between recording capacities of the 640 MB medium and 540 MB medium is based on a difference of sector capacities. When the sector capacity is equal to 2048 bytes, the storage capacity is equal to 640 MB. When the sector capacity is equal to 512 bytes, the storage capacity is equal to 540 MB. The recording format of the medium is the zone CAV and the number of zones of the user area is equal to 10 in case of the 230 MB medium, to 18 in case of the 540 MB medium and 1.3 GB medium, and 11 in case of the 640 MB medium. In this manner, the optical disk drive of the invention can cope with the MO cartridges of the storage capacities such as 128 MB, 230 MB, 540 MB, 640 MB, and 1.3 GB, and further, 230 MB, 540 MB, 640 MB, and the like corresponding to the direct overwrite. Therefore, when the MO cartridge is loaded into the optical disk drive, an ID portion of the medium is first read out, the kind of medium is recognized by the MPU 12 from a pit interval, and the recognized kind as a recognition result is notified to the optical disk controller 14.

As a reading system for the optical disk controller 14, a read LSI 24 is provided. A read demodulating unit and a frequency synthesizer are built in the read LSI 24. A photosensing signal of ,the return light of the beam from the laser diode by a detector 32 for ID/MO provided for the enclosure 11 is inputted as an ID signal and an MO signal to the read LSI 24 through a head amplifier 34 Circuit functions of an AGC circuit, a filter, a sector mark detecting circuit, and the like are provided for the read LSI 24. The read LSI 24 forms a read clock and read data from the inputted ID signal and MO signal and demodulates PPM data or PWM data into the original NRZ data. Since the zone CAV is used, the MPU 12 performs a setting control of a frequency division ratio to generate a zone correspondence clock frequency to the frequency synthesizer built in the read LSI 24. The frequency synthesizer is a PLL circuit having a programmable frequency divider and generates a reference clock, as a read clock, having a predetermined inherent frequency according to a zone position on the medium. That is, the programmable frequency divider is constructed by the PLL circuit having the programmable frequency divider and the MPU 12 generates a reference clock of a frequency of according to a frequency division ratio (m/n) set in accordance with the zone number by the following equation.

$$fo=(m/n)\cdot fi$$

where, a frequency division value n of the denominator of the frequency division ratio (m/n) is an inherent value according to the kind of medium of 128 MB, 230 MB, 540 MB, or 640 MB. A frequency division value m of the numerator is a value which changes in accordance with the zone position on the medium and is prepared as table information of the value corresponding to the zone number with respect to each medium. The read data demodulated by the read LSI 24 is supplied to the reading system of the optical disk controller 14 and is subjected to the inverse conversion of 1-7 RLL. After that, the data is subjected to a CRC check and an ECC process by the decoding function of the ECC unit, so that the NRZ sector data is reconstructed. Subsequently, it is converted into a stream of the NRZ read data coupled with the NRZ sector data by the formatter. This data stream is transmitted to the upper apparatus via the buffer memory 18 by the upper interface 17. A detection signal of a temperature sensor 36 provided on the enclosure 11 side is: supplied to the MPU 12 via the DSP 16. The MPU 12 controls each of the light emitting powers for reading, writing, and erasing in the laser diode unit 30 to an optimum value on the basis of an environment temperature of the unit in the apparatus detected by the temperature sensor 36.

Figure 4:
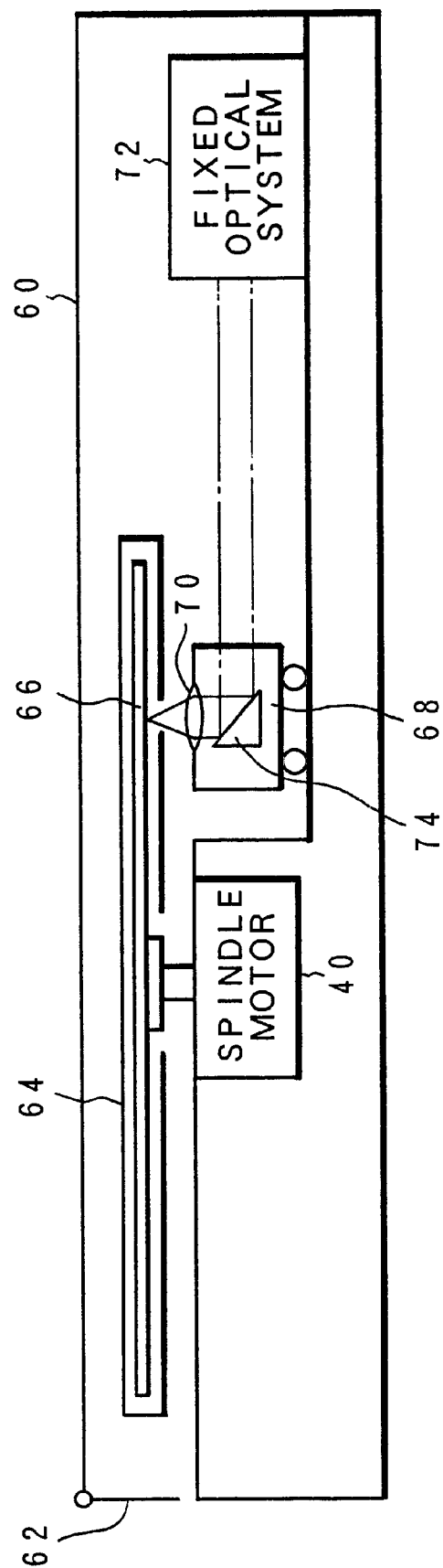
FIG. 4 is an explanatory diagram of an internal structure of the optical disk drive of FIGS. 3A and 3B.

The MPU 12 controls a spindle motor 40 provided on the enclosure 11 side by a driver 38 via the DSP 16. Since the recording format of the MO cartridge is the zone CAV, the spindle motor 40 is rotated at a predetermined speed of, for example, 3000 rpm. The MPU 12 controls a magnetic field applying unit 44 using an electromagnet provided on the enclosure 11 side through a driver 42 via the DSP 16. The magnetic field applying unit 44 is arranged on the side opposite to the beam irradiating side of the MO cartridge loaded in the apparatus and supplies an external magnetic field to the medium at the time of the recording, erasure, or the like. The DSP 16 has a servo function to position the beam from the laser diode unit 30 to the medium and performs a seek control (coarse control) and a track-following control (fine control) to seek and move the laser beam to a target track so as to enter an on-track state. The seek control and track-following control can be simultaneously executed in parallel with a write access or a read access in response to an upper command by the MPU 12. To realize a servo function of: the DSP 16, a detector 45 for FES for receiving the beam return light from the medium is provided for the optical unit on the enclosure 12 side. An FES detecting circuit (focusing error signal detecting circuit) 46 forms a focusing error signal from a photosensing output of the detector 45 for FES and sends it to the DSP 16. A detector 47 for TES having a multidivision (6 division or 9 division) photosensing unit to receive the beam return light from the medium is provided for the optical unit on the enclosure 11 side. A TES detecting circuit (tracking error signal detecting circuit) 48 forms a tracking error signal from a photosensing output of the detector 47 for TES and sends it to the DSP 16. In the embodiment, the tracking error signal is formed by a push-pull method (also referred to as a far field method). The tracking error signal is inputted to a TZC detecting circuit (track zero-cross point detecting circuit) 50 and a track zero-cross pulse is formed and inputted to the DSP 16. Further, to control the position of a beam spot on the medium, the DSP 16 controls a focusing actuator 52 and a VCM 54 through drivers 55 and 58. An outline of the enclosure 11 in the optical disk drive is as shown in FIG. 4. The spindle motor 40 is provided in a housing 60. By inserting an MO cartridge 64 from the side of an inlet door 62 to a hub of a rotary shaft of the spindle motor 40, the loading such that an internal MO medium 66 is loaded to a hub of the rotary shaft of the spindle motor 40 is performed. The head mechanism is constructed by a carriage 68, an objective lens 70, a fixed optical system 72, and a mirror 74. The carriage 68 which can be freely moved by the VCM 54 in the direction which transverses the tracks on the medium is provided below the MO medium 66 of the loaded MO cartridge 64. The objective lens 70 is mounted on the carriage 68, allows the beam from a laser diode provided for the fixed optical system 72 to enter through the rising mirror 74, and forms an image of a beam spot onto the medium surface of the MO medium 66. The objective lens 70 is moved in the optical axial direction by the focusing actuator 52 shown in the enclosure 11 in FIGS. 3A and 3B. The laser beam can be moved in the radial direction which transverses the tracks on the medium by the linear driving of the carriage 68 by the VCM 54. The carriage 68 is supported by a slide bearing to two guide rails which are fixedly arranged and simultaneously performs a seek control called a coarse control for moving the laser beam to an arbitrary track position and a track-following control known as a fine control for allowing the laser beam to trace the track center at the sought track position. As a head mechanism of the single driving type as mentioned above, a mechanism disclosed in, for example, JP-A-9-312026, JP-A-9-54960, or the like can be used.

Figure 1:
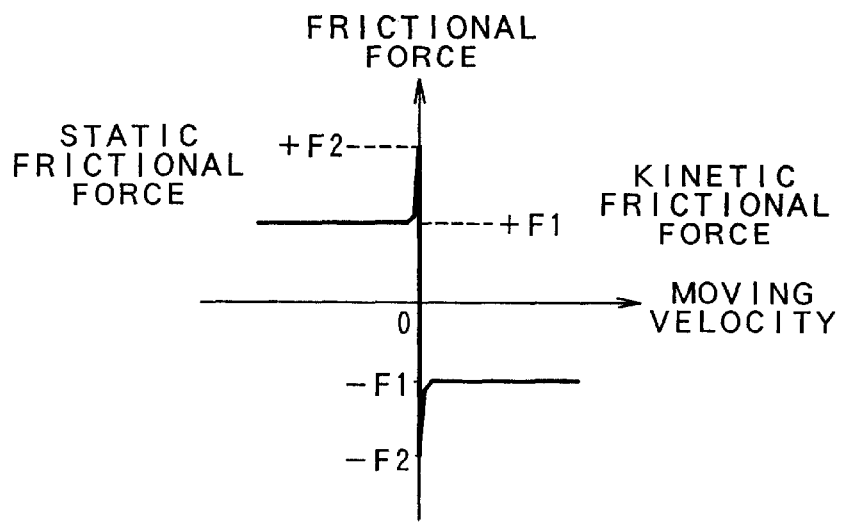
FIG. 1 is a characteristics diagram of a Coulomb friction for a moving velocity in a head mechanism of a single driving type.
Figure 2:
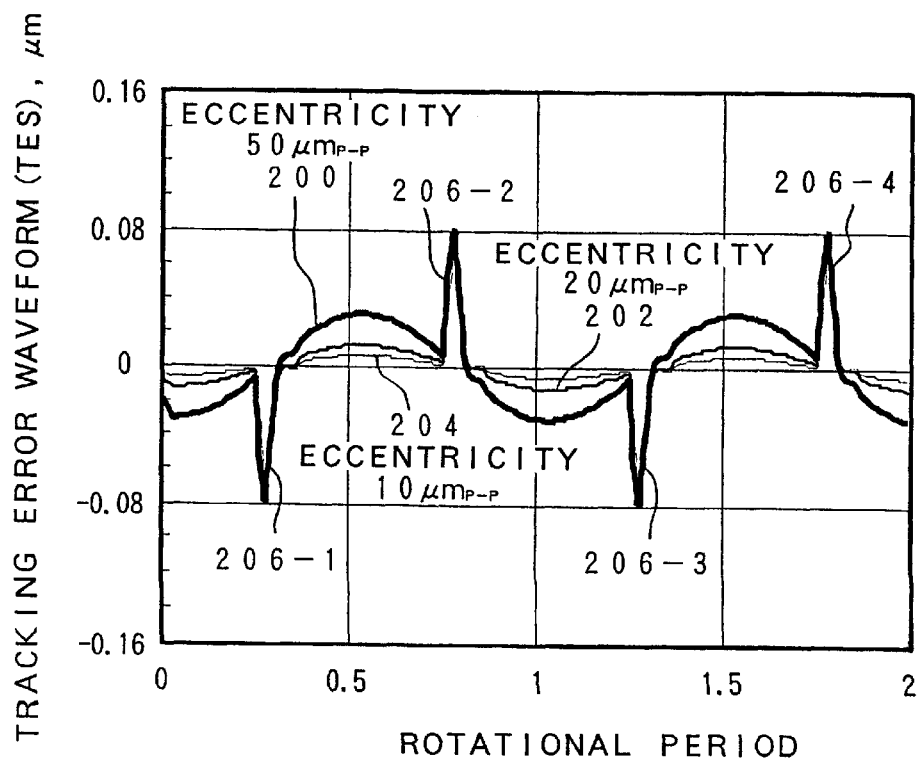
FIG. 2 is an explanatory diagram of an eccentricity tracking error due to a feedback control system when a head is subjected to a repetitive disturbance by the Coulomb friction.
Figure 5:
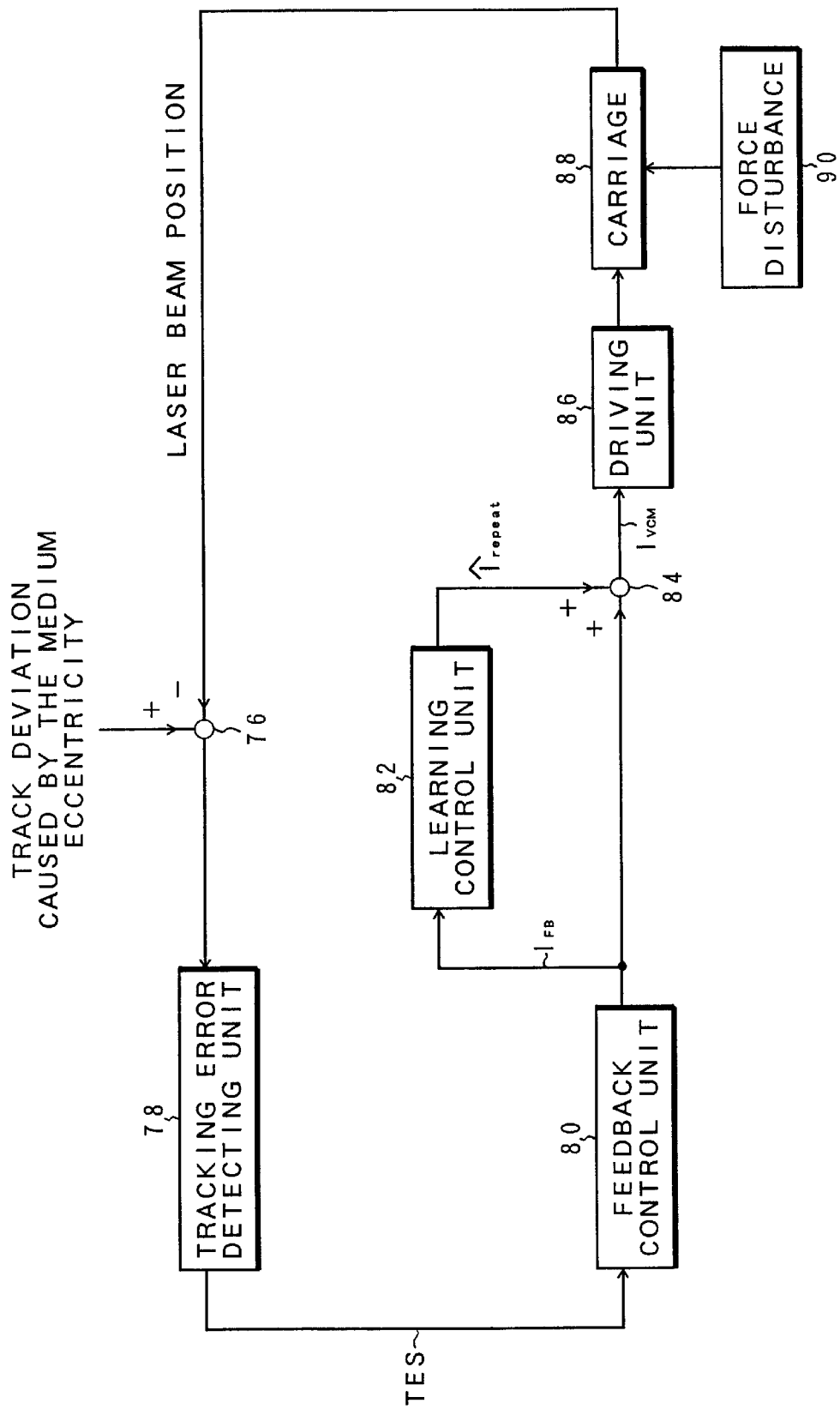
FIG. 5 is a block diagram of the first embodiment of the invention in which a learning control unit is provided between a feedback control unit and a driving unit.

FIG. 5 shows the first embodiment of a feedback control system of the head mechanism in the storage apparatus of the invention. The first embodiment is characterized in that the learning control unit is provided between a feedback control unit and a carriage driving unit. The feedback control system of the head mechanism comprises: a tracking error detecting unit 78; a feedback control unit 80; a learning control unit 82; an adder 84; a carriage driving unit 86; and a carriage 88. The tracking error detecting unit 78 generates the tracking error signal TES showing a positional deviation amount for the track center from the return light by the irradiation of the laser beam to the medium by an objective lens mounted on the carriage 88. As shown in FIG. 5, the tracking error detecting unit 78 optically detects and outputs the tracking error as a difference between the track position which is fluctuated by the eccentricity of the medium and the position of the laser beam. The feedback control unit 80 moves the carriage 88 by the carriage driving unit 86 so as to eliminate the deviation amount of the laser beam for the track center by setting the tracking error signal TES to zero. The feedback control unit 80 generates the control signal $I_{FB}$ by, for example, a PID arithmetic operation. The control signal $I_{FB}$ becomes a feedback current instruction value for the carriage driving unit 86 using the VCM 54 shown in FIGS. 3A and 3B. The learning control unit 82 receives the control signal $I_{FB}$ as a feedback current instruction value outputted from the feedback control unit 80 and gets a learning control signal I^repeat, by a learning law, as an approximated function of an unknown drive current function Irepeat to suppress a tracking error caused by such as repetitive frictional disturbance, eccentricity disturbance, or the like in association with the eccentric rotation of the medium. When the learning is finished, the learning control signal I^repeat. obtained as a learning result is outputted synchronously with the medium rotation. The learning control signal I^repeat is added as a feed-forward control signal to the control signal $I_{FB}$ from the feedback control unit 80 by the adder 84, so that a drive signal $I_{VCM}$ is derived. $I_{VCM}$ drives the carriage 88 through the carriage driving unit 86. In association with the reversal of the moving velocity by the reciprocating motion of the carriage 88 in association with the eccentric rotation of the medium, a large frictional disturbance whose direction changes in an instant at a point when the moving velocity is equal to zero as shown in FIG. 1 is periodically applied to the carriage 88 as a force disturbance 90.

Figure 6:
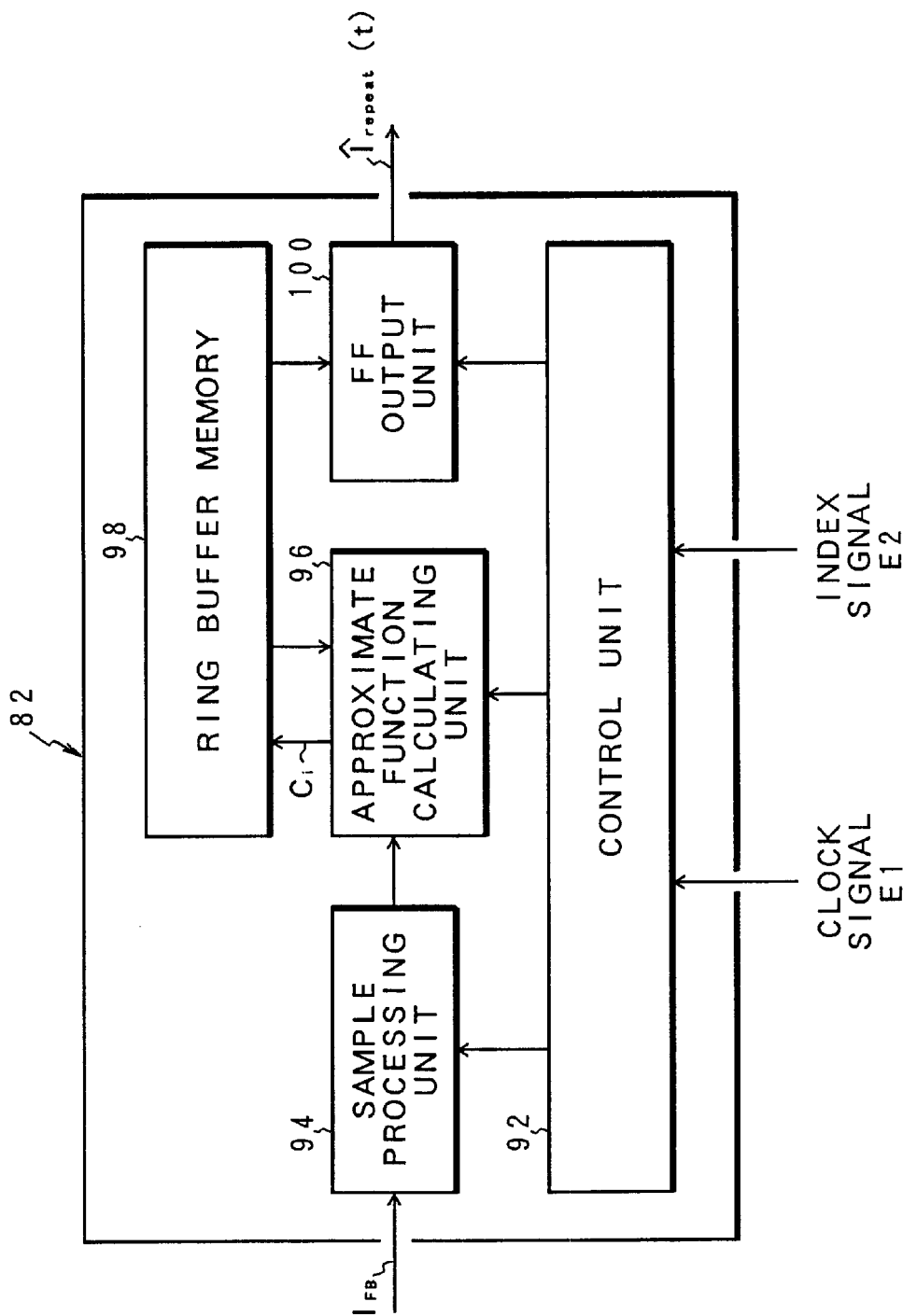
FIG. 6 is a functional block diagram of the learning control unit in FIG. 5.

FIG. 6 is a functional block diagram of the learning control unit 82 in FIG. 5. The learning control unit 82 comprises: a control unit 92; a sample processing unit 94; an approximated function calculating unit 96, a ring buffer memory 98; and a feed-forward output unit (hereinafter, referred to as an "FF output unit") 100. A clock signal E1 and an index signal E2 which is obtained synchronously with one rotation of the medium are inputted to the control unit 92. The control unit 92 sets I. learning mode II. learning result output mode as operating modes of the learning control unit 82. The learning mode is executed at the time of a loading process after the medium was inserted and the learning control signal I^repeat as a periodic approximated function is learned in accordance with a learning law. In the learning result output mode, the learning law does not operate but the learning control signal I^repeat obtained as a learning result is outputted synchronously with the medium rotation and is added to the feedback control system as a feed-forward output. Therefore, in the learning mode, the control unit 92 makes the sample processing unit 94, approximated function calculating unit 96, ring buffer memory 98, and FF output unit 100 operative. In the learning result output mode after completion of the learning, the control unit 92 makes the ring buffer memory 98 and FF output unit 100 operative. A learning algorithm which is used in the invention and executed by the approximated function calculating unit 96 provided for the learning control unit 82 in FIG. 6 will now be described. In the feedback control system in FIG. 5, it is regarded that most of the drive current $I_{VCM}$ to drive the carriage 88 synchronously with the medium rotation is a repetition signal of the period synchronized with the medium rotation and can be captured as a current pattern as shown in, for example, FIG. 7. A case where the current pattern which is periodically repeated is captured as an unknown drive current function Irepeat(t) and approximately expressed by the height of each rectangular function obtained by dividing the period $T_L$ for one medium rotation period into N intervals will now be considered. A time width T for each single rectangular function is $$T = T_L/N$$

Figure 7:
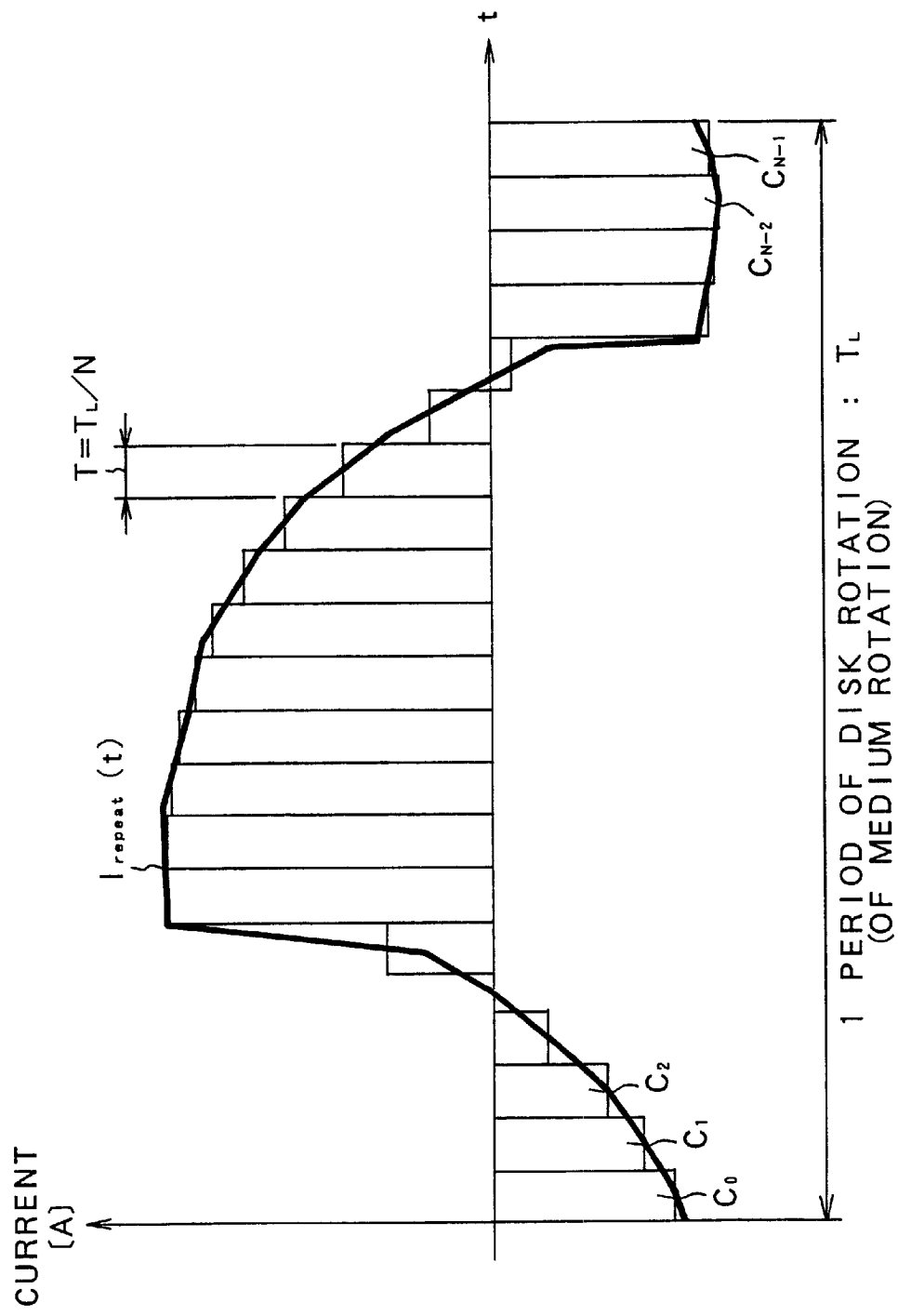
FIG. 7 is an explanatory diagram of the function approximation of a periodic control input by the learning control unit in FIG. 5.

Now, assuming that the height of each rectangular function obtained by dividing the current pattern in FIG. 7 into N intervals is labeled to $C_i$ (where, i=0, 1, ..., N−1), the approximated function I^repeat is obtained by the following equation.

$$I\hat{}\text{repeat}(t) = C_i \tag{2}$$

where, i=floor(t/T)

T=$T_L$/N

0≦t<$T_L$

The floor(t/T) function of the equation (2) returns the maximum integer value which is smaller than or equal to the argument in (t/T). For example, when the argument in (t/T) is equal to (0~0.9), floor(0~0.9)=0. When the argument in (t/T) is equal to (1.0~1.9), floor(1.0~1.9)=1. The time t is reset by the index signal which is obtained at a certain time in every medium rotation, so that it has a value of 0≦t<$T_L$. As for the height $C_i$ of each rectangular function of the approximated function I^repeat of the equation (2), the learning is progressed in accordance with the following equation by integrating the control signal $I_{FB}$ corresponding to each rectangular function.

$$\dot{C}_i = \text{Klearn} \cdot I_{FB}(t) \quad (3)$$

where, i=floor(t/T) and $\dot{C}_i$ is an update of $C_i$

Klearn in the equation (3) denotes a learning gain and is a positive constant. As shown in the equation (3), the value of i is determined in accordance with the value of t, namely, the height $C_i$ as a learning target is selected, and an integration arithmetic operation using the value $I_{FB}(t)$ of the control signal at that time as an input is executed. According to the learning law according to the equation (3), the height of each rectangular function is sequentially integrated until the value of $I_{FB}$ as an input of the learning law is equal to almost zero. Therefore, after the settlement of the learning, the approximated function $\Gamma$repeat(t) which is expressed by the rectangular functions $C_0$ to $C_{N-1}$ becomes a function which approximates Irepeat(t) as an unknown drive current function.

A learning result according to the equation (3)

$$\Gamma \text{repeat}(t) = C_i$$

where, i=floor(t/T)
$T = T_L / N$
$0 \leq t < T_L$ becomes a feed-forward output in the learning result output mode and is directly inputted to the drive current $I_{VCM}$ of the carriage driving unit 86 to drive the carriage 88. Therefore, it seems from the feedback control system as if the repetitive disturbance having periodicity was extinguished. According to such a compensating method of the repetitive disturbance by the learning in the invention, even if it takes a slightly long time for settlement to obtain the learning result, that is, even if the learning gain Klearn for learning is low, a signal of a high frequency band, strictly speaking, a compensation signal of a high frequency band for the repetitive disturbance having the periodicity can be included in a learning control signal which is finally obtained.

Figure 8:
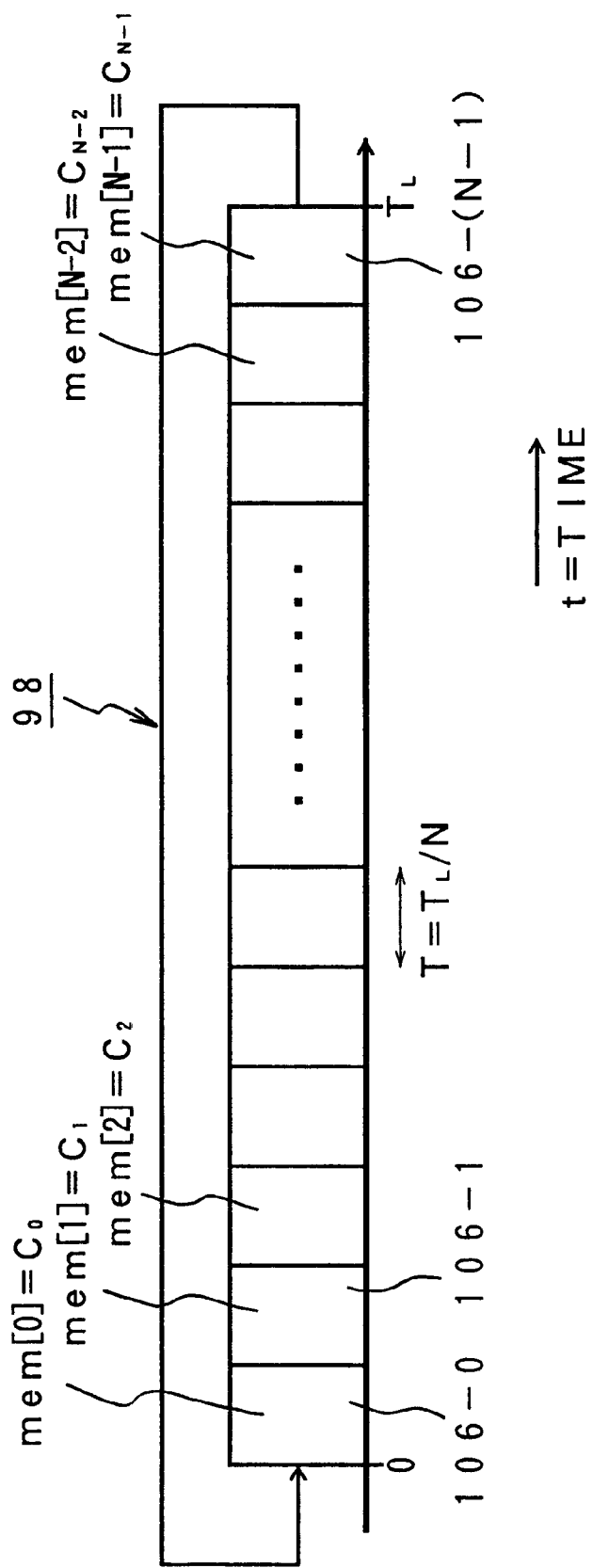
FIG. 8 is an explanatory diagram of a memory in FIG. 6.

The height $C_i$ of each rectangular function obtained by the learning law of the equation (3) has been stored in a relevant memory cell in the ring buffer memory 98. FIG. 8 shows a memory construction of the ring buffer memory 98 provided for the learning control unit 82 in FIG. 6. The ring buffer memory 98 has N memory cells 106-0 to 106-(N-1) in correspondence to the number N of division of the period $T_L$ for one medium rotation period. The value of the height $C_i$ of each rectangular function calculated by the equation (3) synchronously with the disk rotation is stored as mem[i] into a cell address (i) of the memory cells 106-0 to 106-(N-1). The time t shown in correspondence to the positions of the memory cells 106-0 to 106-(N-1) in the ring buffer memory 98 is time which is reset by the index signal obtained at a certain time in every medium rotation. The time t is detected by setting the time of the rotation start position when the index signal is obtained to t=0 and by setting this time point to a start point in every medium rotation. The time width T of each rectangular function shown in FIG. 7 is set to a longer width as compared with the sampling period Tsample of the input signal $I_{FB}$ by the sample processing unit 94 in FIG. 6. The memory cell as a target in the ring buffer memory 98 to which the learning calculation result of the equation (3) is applied at time t is determined by the calculation of the address (i) of the following equation.

$$i = \text{floor}(t/T) \quad (4)$$

T is a time width of each rectangular function and $T = T_L/N$. For example, assuming that the rotational speed of the medium is equal to 4500 rpm, its rotating frequency is equal to 75 Hz and the period $T_L$ of one rotation is $T_L = 13.3$ msec. It is now assumed that one period $T_L$ is divided into, for example, N=128 intervals. In this case, the time width T for each rectangular function is $$T = T_L/N = 104.2 \ \mu sec$$

Therefore, now assuming that a sampling frequency of the control signal $I_{FB}$ from the feedback control unit 80 to the learning control unit 82 is equal to 55 kHz, namely, sampling period Tsample=18.18 $\mu$sec, the control signal $I_{FB}$ is sampled about five times in the time width T of each rectangular function. That is, as for each rectangular function, the learning arithmetic operation of the equation (3) is performed every about five times per medium rotation. A learning arithmetic operation when the learning law of the equation (3) is actually implemented to the DSP is given by the following equation.

$$mem[i] = mem[i] + \text{Klearn} \cdot \text{Tsample} \cdot I_{FB}(t) \quad (5)$$

where, i=floor(t/T)

As will be obviously understood from the equation 5), the arithmetic operation results which are stored into the memory cells 106-0 to 106-(N-1) in FIG. 8 are based on the integration arithmetic operation in which the learning gain Klearn is used as an integration gain and the control signal $I_{FB}$ is used as an input. That is, it is a process for reading out the learning result mem[i] previously stored in the memory cell in the corresponding address (i), adding {Klearn× Tsample×$I_{FB}(t)$} calculated at every sampling timing to the read-out learning result mem[i], and storing an addition result after that. The arithmetic operation of the equation 5) will now be described hereinbelow with respect to the height $C_i$ of each rectangular function. That is, an initial value (ordinarily, zero) has been set into mem[i] before learning. A rectangular function to be updated is selected for a specific time interval in each disk rotation after the start of the learning, namely, for a period of time during which the condition of i=floor(t/T) is satisfied. The integration arithmetic operation of the equation 5) for mem[i] as a target is performed by using $I_{FB}(t)$ at that time as an input. For the other period of time, another rectangular function to be updated is selected and similar processes are executed. For a period of time when another rectangular function is selected, the value of mem[i] is not updated. After the disk rotates once and the rectangular function $C_i$ is again selected, the integration arithmetic operation of the equation 5) is further performed by using the integration result up to the previous rotation which has already been stored in mem[i] as an initial value. In the learning mode, simultaneously with the integrating process in the corresponding memory cell in the ring buffer memory 98 of the calculation result of the approximated function calculating unit 96 according to the equation 5), the FF output unit 100 likewise performs a feed-forward control such that the calculation result of the corresponding memory cell in the ring buffer memory 98 is read out and it is added by the adder 84 in FIG. 5 and a resultant addition value is added to the feedback control system. In the learning mode, with respect to the elapsed time from the time t=0 when the index signal E2 is obtained to a point when the index signal is subsequently obtained, in a range from t=0 to $T_L$, the approximated function calculating unit 96 in FIG. 6 calculates the cell address (i) by the equation (4) and performs the storage of the calculation result $C_i$ into the ring buffer memory 98 by the approximated function calculating unit 96 by the output of an address control signal and the reading and output of the learning result at that time to the FF output unit 100.

After the learning process according to the learning mode in the loading process of the medium is completed, the learning control unit 82 in FIG. 6 shifts the operating mode to the learning result output mode. In the learning result output mode, the control unit 92 makes the ring buffer memory 98 and FF output unit 100 operative and performs the feed-forward control such that the learning control signal I^repeat as a learning result stored in each memory cell is read out from the ring buffer memory 98, for example, at the same reading period as the sampling period Tsample in the learning mode synchronously with the index signal E2 that is obtained every medium rotation, the read-out signal I^repeat is outputted to the adder 84 in FIG. 5 from the FF output unit 100 and added to the control signal $I_{FB}$ obtained by the feedback control unit 80 at that time, the drive current $I_{VCM}$ is supplied to the carriage driving unit 88, and the carriage 88 is derived so that the repetitive frictional disturbance is suppressed in association with the medium eccentricity. To guarantee the stability of the learning process in the learning mode, in the case where the latest learning result is outputted to the feedback control system by the FF output unit 100 simultaneously with the learning process by the A.F.C.U. 96, it is necessary to feed-forward output the learning result at the advanced time in consideration of the time delay such as a phase delay or the like of the control target. Owing to the feed-forward output of the learning result at the advanced time, there is no need to use a so-called phase-lead filter or the like. In the learning control unit 82, as shown in FIG. 7, since the current pattern serving as a feed-forward output is managed in correspondence to the time t, it is sufficient to select the memory cell in correspondence to the advanced time in consideration of the phase delay of the control target and to output the learning result at that time. That is, now assuming that the elapsed time from the start time point for one medium rotation period when the index signal is obtained is equal to t, although the memory cell to store the learning result is selected by the equation (4), the selection of the memory cell for the feed-forward output by the FF output unit 100 is calculated by the following equations when it is assumed that the advanced time is labelled as $\Delta$tlead.

$$\begin{cases} i = \text{floor}\{(t + \Delta tlead)/T\}, \\ \text{if } 0 \leq t < (T_L - \Delta tlead) \\ i = \text{floor}\{(t + \Delta tlead - T_L)/T\}, \\ \text{if } (T_L - \Delta tlead) \leq t < T_L \end{cases}$$

As shown in the first equation of the equations (6), fundamentally, the memory cell number i is determined on the basis of the time obtained by adding the lead time $\Delta$tlead to the time t. However, when t exceeds $(T_L - \Delta tlead)$, namely, when $(T_L - \Delta tlead) \leq t < T_L$, the memory cell number i is calculated in accordance with the calculation as shown in the second equation of the equations (6). That is, the reading position is returned to the head in the ring buffer and the data is read out from an instance when t exceeds $(T_L - \Delta tlead)$.

By performing the advance compensation for the feed-forward output of the learning result as mentioned above, a situation such that a response waveform in the case where the advance compensation is not performed becomes oscillatory is prevented and the stable learning result can be obtained.

Figure 9:
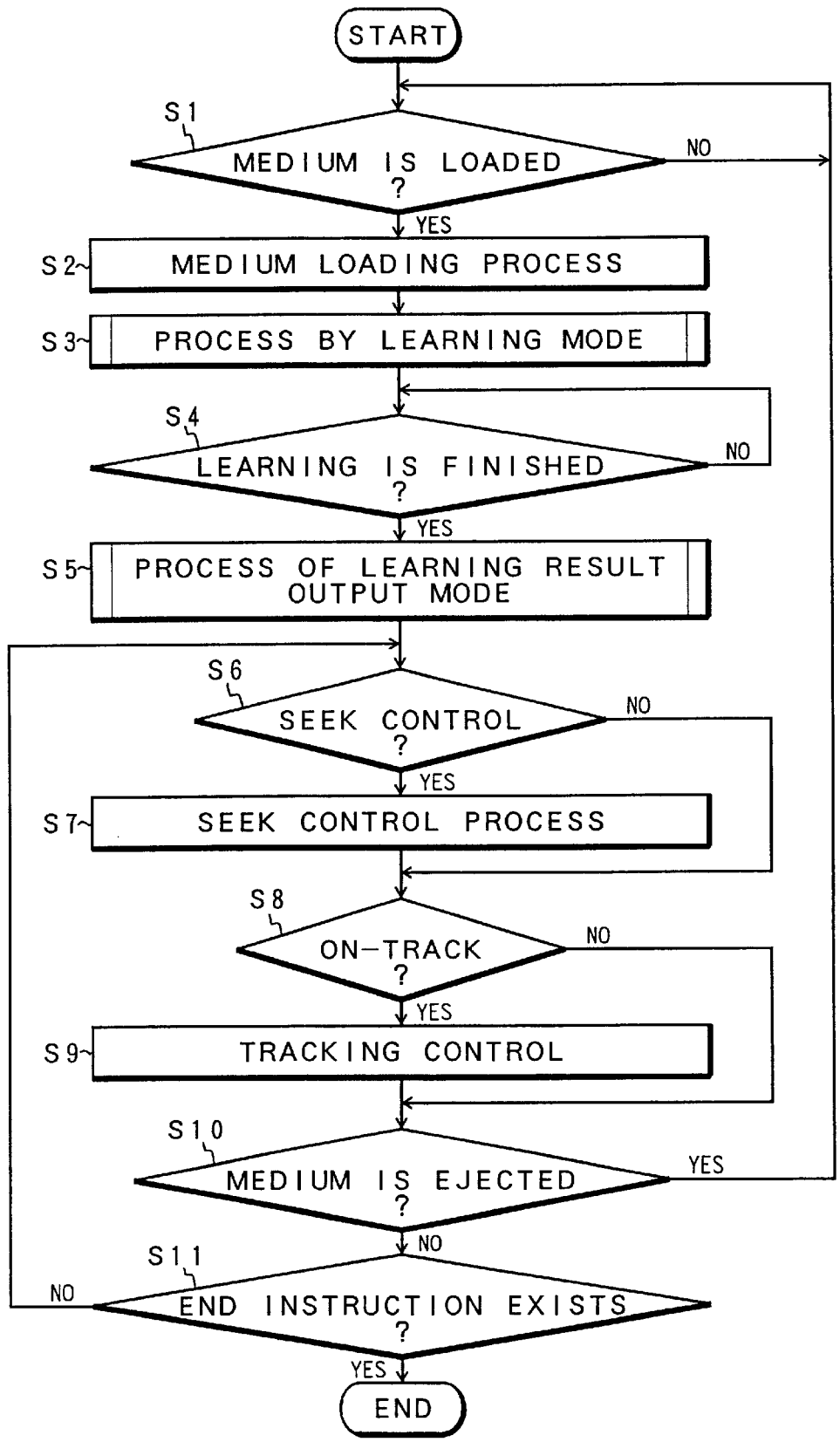
FIG. 9 is a flowchart for a control process of the first embodiment in FIG. 5.

FIG. 9 is a flowchart for a positioning control in the storage apparatus of the invention having the learning control unit 82 in FIG. 5. First in step S1, when the medium is loaded into the apparatus, a medium loading process according to a predetermined medium loading sequence is executed in step S2. In the medium loading process, a process in the learning mode in step S3 by the learning control unit 82 newly provided in the invention is executed.

The end of the learning process in the learning mode is discriminated by

I. the number of learning times,

II. learning time,

III. evaluation of the tracking error signal TES, or the like

For example, in case of discriminating the end of the learning by the time setting, the number of times of rotation of the disk after the start of the learning is counted and when it is equal to the specified number of times, the learning is finished. When the end of the learning is confirmed in step S4, step S5 follows and the processing routine advances to the process in the learning result output mode. In the learning result output mode, the learning result obtained in step S3 is feed-forward outputted as a fixed value to the feedback control system. In the seek control and track-following control after step S6, therefore, the eccentricity disturbance synchronized with the medium rotation, particularly, the peak-like frictional disturbance occurring at a timing of the zero moving velocity in association with the reciprocating movement of the carriage corresponding to the medium eccentricity is effectively suppressed by a feed-forward output based on the learning result. A stable control environment without a repetitive disturbance is obtained in view of the feedback control system. Therefore, in the processes after the learning result output mode in step S5, if there is the seek control in step S6, step S7 follows. The seeking process for positioning the carriage toward the target track by controlling the velocity, what is called a coarse control is performed. When the laser beam is moved to the target track so as to enter an on-track state by the seek control in step S8, the track-following control to trace the laser beam to the target track center is performed in step S9. The seek control or on-track control in steps S6 to S9 corresponding to the process in the learning result output mode in step S5 is repeated until the medium ejection is discriminated in step S10. When the medium is ejected, the processing routine is returned to step S1. When the next medium is loaded, the learning process in the learning mode in step S3 is newly performed. When there is an end instruction in step S11, the series of processes is finished. As for the process in the learning mode in step S4 by the learning control unit 82, at the time of the getting operation of the approximated function, the approximated function getting operation is performed at each of a plurality of positions in the disk radial direction. In this instance, in the approximated function getting operation at a plurality of positions, if the approximated function which has already been obtained at another position exists, the learning control unit 82 applies the learning algorithm by using the already existing approximated function data as an initial value. In the process in the learning result output mode in step S5 at the time of the feed-forward after the learning, the learning control unit 82 selects the approximated function which is used in accordance with the radial direction position at that time and performs the feed-forward operation. For example, an example in which there are 15000 tracks in a range from the inner region to the outer region on the disk will be considered. First, the approximated function getting operation is performed at a location near the 7500th track corresponding to the position near the center region. Subsequently, to obtain the approximated function near the inner region, the laser beam is sought and moved to a position near the 2500th track. The approximated function getting operation is performed at a position near the 2500th track by using another set of memory cells which is separately prepared to obtain the approximated function for the inner region. Subsequently, to obtain the approximated function near the outer region, the laser beam is sought and moved to a position near the 12500th track The approximated function getting operation is performed at a position near the 12500th track by using another set of memory cells which is separately prepared to obtain the approximated function for the outer region. Now, assuming that the learning is finished when the disk rotates 100 times, for instance, the learning which is performed at the 7500th track is executed at a location between the 7500th track and the 7600th track. In the learning at the inner region which is executed after that, its approximated function is considered to be almost equal to the function obtained at the center region. Therefore, the initial value (initial value of each value in the memory cells) of the approximated function is not started from zero but the learning result at the center region is copied into the set of memory cells for the inner region and the learning is started by using it as an initial value. Thus, the learning time can be reduced. For example, the learning can be finished when the disk rotates 50 times. In the learning at the outer region as well, the learning time can be similarly reduced. The above operations are performed, for example, at the time of the medium loading. Three approximated functions for the inner region, center region, and outer region are prepared. In the subsequent operating state, when the laser beam is moved to a track in a range from the first to the 5000th tracks and the reading/writing operation is performed, the approximated function obtained at a position near the 2500th track is fed forward. When the laser beam is moved to a track in a range from the 5001st to, the 10000th tracks and the reading/writing operation is performed, the approximated function obtained at a position near the 7500th track is fed forward. Further, when the laser beam is moved to a track in a range from the 10001st to the 15000th tracks and the reading/writing operation is performed, the approximated function obtained at a position near the 12500th track is fed forward. Consequently, for example, as compared with the case where the approximated function obtained at one position near the center region is used for the whole region from the inner region to the outer region, if the circularity of the track in the inner region on the disk differs from that in the outer region, if the difference between the phases or amplitudes of the repetitive disturbances in association with the spindle rotation in the inner region and the outer region cannot be ignored, or even if the magnitudes of the frictions in the inner region and the outer region are different in case of using the pickup having the structure of the single driving type, the tracking operation of a higher precision can be performed.

Figure 10:
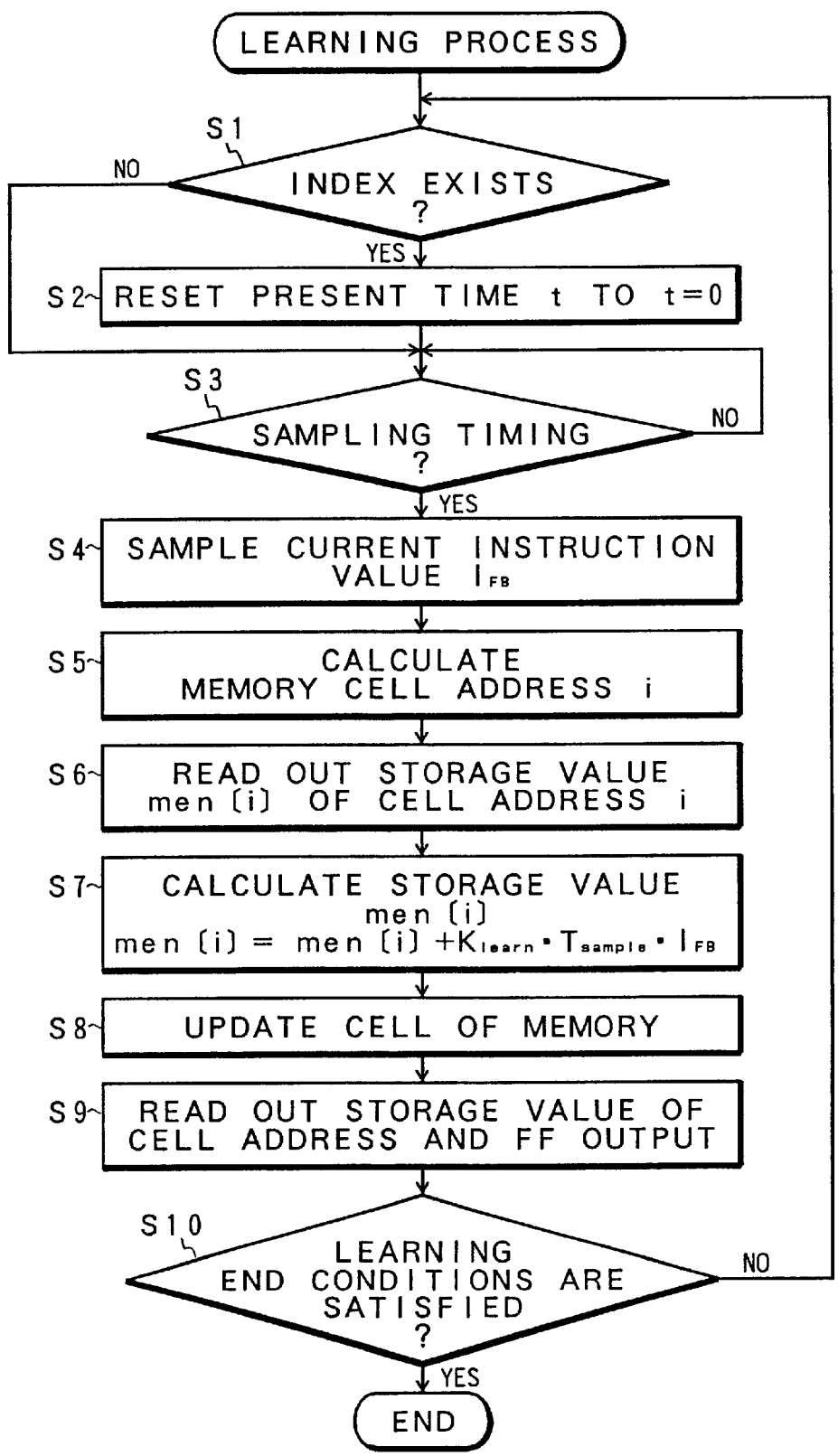
FIG. 10 is a flowchart for the learning control unit in FIG. 9.

FIG. 10 is a flowchart for the learning process in the learning mode in the learning control unit 82 in FIG. 6. In the learning process, the presence or absence of the index which is obtained every rotation of the medium is first checked in step S1. When the index is obtained, step S2 follows and the present time t is reset to t=0. Whether the time t is the sampling timing or not is discriminated in step S3. If YES, the current instruction value $I_{FB}$ as a control signal is sampled in step S4. The address (i) of the memory cell is calculated from the time t at that time in step S5 on the basis of the equation (4). The storage value mem[i] of the cell address (i) is read out in step S6. In step S7, a new storage value mem[i] is subsequently calculated in accordance with the equation 5). The newly calculated storage value is stored into the memory cell and updated in step S8. In step S9, the previous storage value in the cell address calculated by the equation (6), namely, the cell address that is preceding by the lead time Δtlead is read out and feed-forward outputted to the feedback control system. The processes in steps S1 to S9 as mentioned above are repeated until a learning end condition is satisfied, for example, the present time reaches a preset learning time in step S10.

Figure 11:
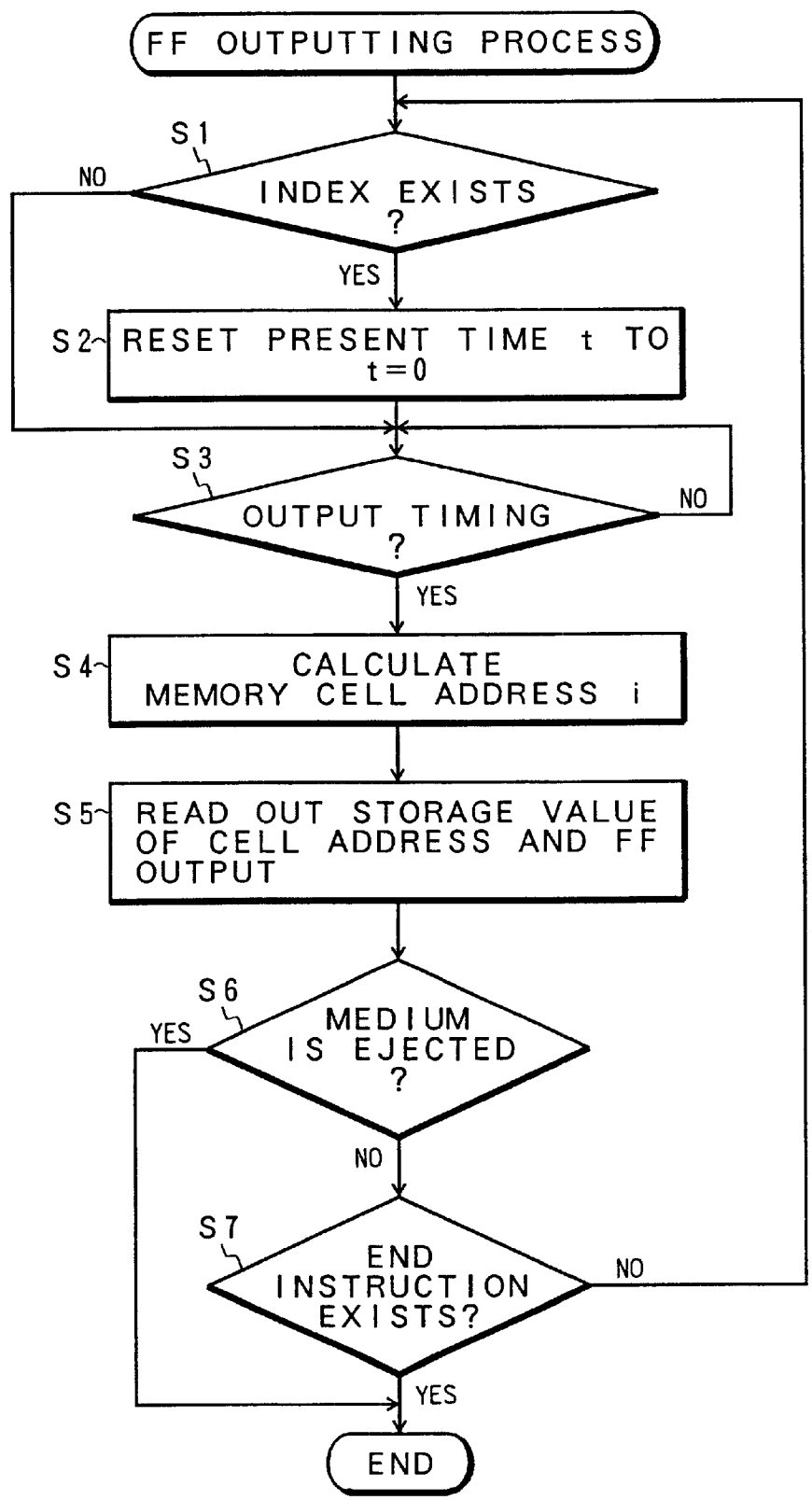
FIG. 11 is a flowchart for a feed-forward outputting process in FIG. 9.

FIG. 11 is a flowchart for a feed-forward, outputting process in the learning result output mode of the learning control unit 82 in FIG. 6. In the feed-forward outputting process, the presence or absence of the index which is obtained every medium rotation is discriminated in step S1. When the index is obtained, the present time t is reset to t=0 in step S2. Whether the present time is an output timing or not is discriminated in step S3. It is assumed that the output timing is, for example, a timing that is determined by the same output period as the sampling period Tsample in the learning mode in FIG. 9. When the output timing is discriminated in step S3, the address (i) in the memory cell based on the time obtained by adding an advanced (a lead) time Δtlead to the present time t by the equation (6) is calculated in step S4. In step S5, the storage value in the cell address is read out and feed-forward outputted to the feedback control system. If there is a medium ejection in step S6 or if there is an end instruction of the apparatus in step S7, the feed-forward output is finished.

Figure 12A:
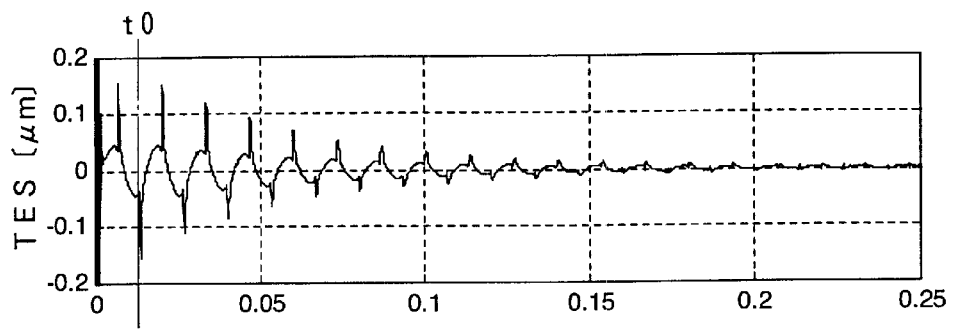
FIGS. 12A to 12D are waveform diagrams of a tracking error signal, a feedback control signal, a learning control signal, and a drive signal for a period of time from the start of the learning to the end thereof according to the first embodiment in FIG. 6.
Figure 12B:
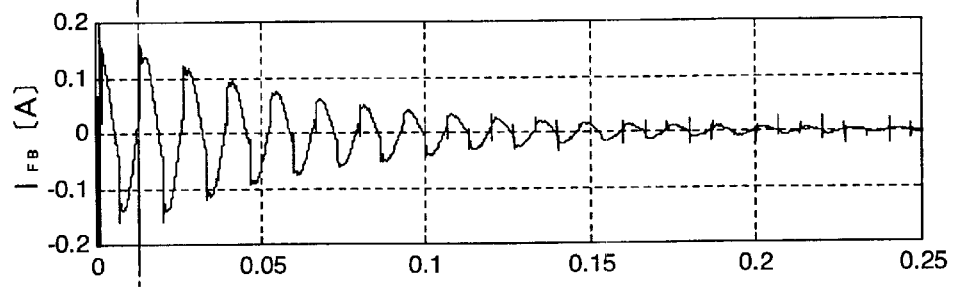
Figure 12C:
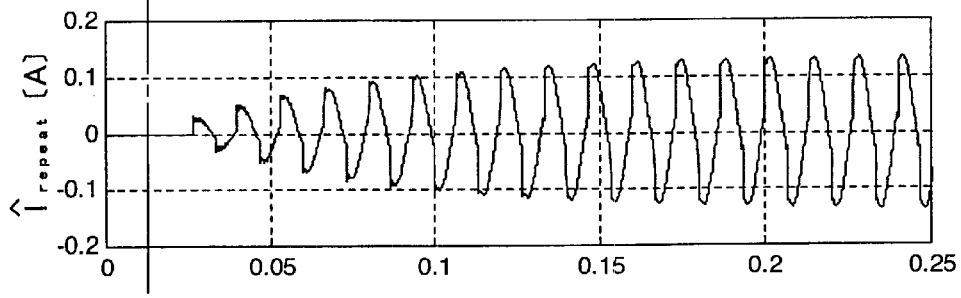
Figure 12D:
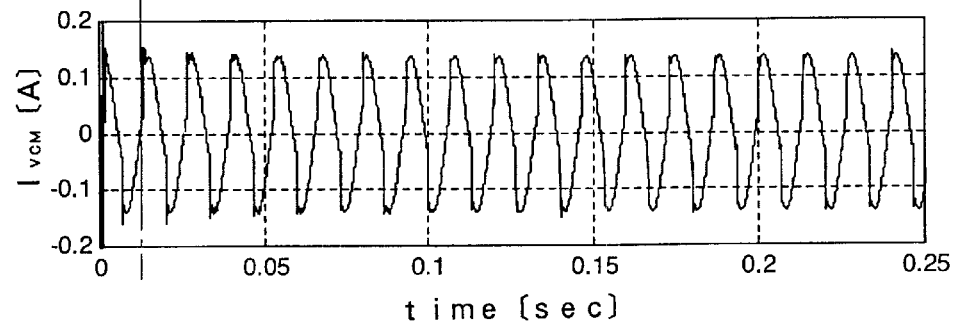
Figure 13A:
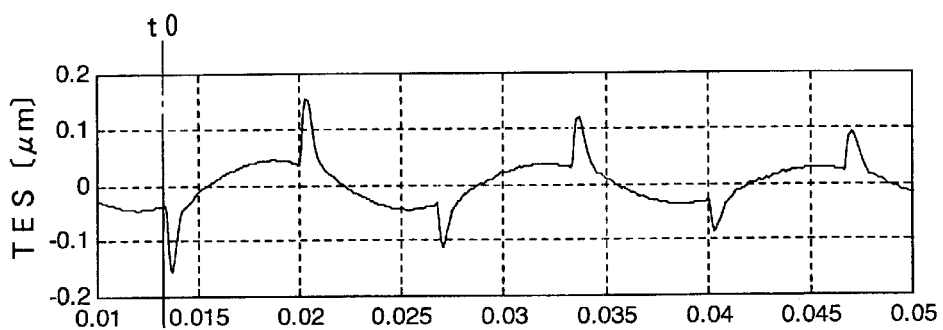
FIGS. 13A to 13D are waveform diagrams in which a learning start portion in FIGS. 12A to 12D is enlarged by a time base.
Figure 13B:
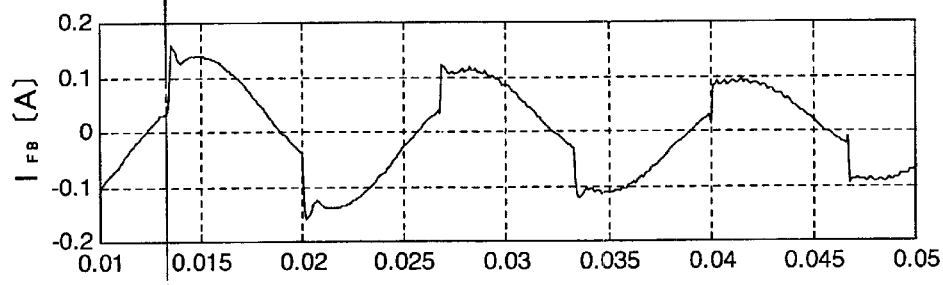
Figure 13C:
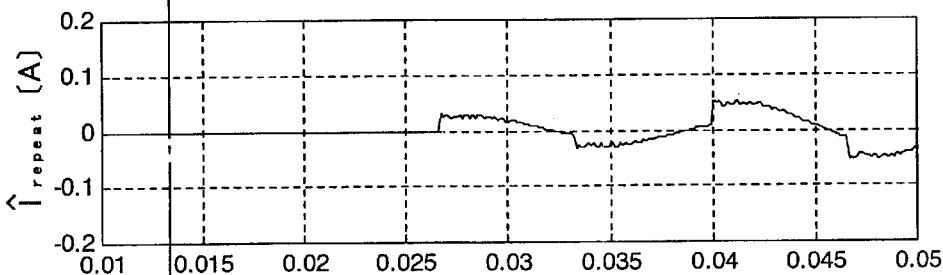
Figure 13D:
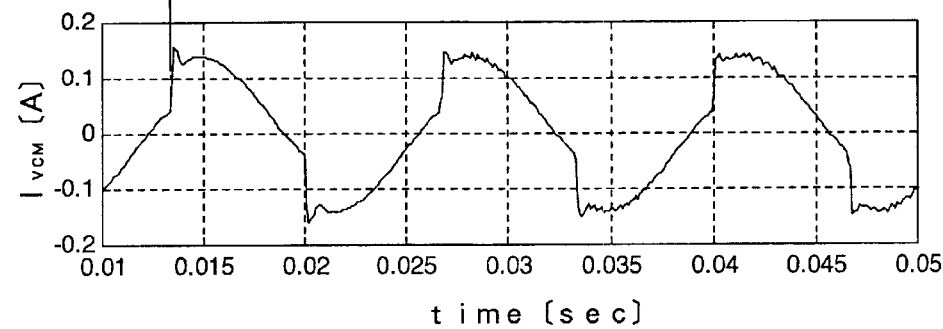

FIGS. 12A to 12D are waveform explanatory diagrams of the tracking error signal TES, feedback control signal $I_{FB}$, learning control signal I^repeat, and carriage drive signal $I_{VCM}$ for a period of time from the start of the learning to the end thereof by the learning control unit 82 in the first embodiment of FIG. 5. An axis of abscissa indicates the time by seconds. FIG. 12A shows the tracking error signal TES. FIG. 12B shows the feedback control signal $I_{FB}$. FIG. 12C shows the learning control signal I^repeat. Further, FIG. 12D shows the carriage drive signal $I_{VCM}$. In FIGS. 12A to 12D, the learning process is started from time t0. Just after the start of the learning at time t0, the tracking error signal TES in FIG. 12A shows a large positional deviation due to the peak-like frictional disturbance and the eccentricity occurring at the zero moving velocity of the carriage in association with the medium eccentricity. The tracking error signal TES gradually attenuates in association with the progress of the learning and the frictional disturbance and the positional deviation are finally suppressed. In the first one rotation just after the learning start time t0, the learning control signal I^repeat is the initial value of zero of the learning because it is read out from the cell for Δtlead future from the cell that is currently updated. The learning process from time t0 is a process such that the disturbance component included in the feedback control signal $I_{FB}$ in FIG. 12B is transferred step by step to the learning control signal I^repeat which is outputted as a learning result as shown in FIG. 12C. When the present time reaches time within a range from 0.2 to 0.25 sec on the learning end side, the disturbance component included in the feedback control signal $I_{FB}$ in FIG. 12B at the time of the start of the learning is almost transferred into the learning control signal I^repeat serving as a feed-forward output in FIG. 12C, so that the disturbance seen in the tracking error signal TES in FIG. 12A is almost perfectly suppressed.

FIGS. 13A to 13D enlargedly show a learning start portion corresponding to the time within a range from 0.01 to 0.05 sec in FIGS. 12A to 12D on the basis of the time base. The learning is started from time t0 in the figures. At this time point, the tracking error due to the large eccentricity of the medium and the peak-like tracking error due to the steep change of frictional disturbance at the zero moving velocity of the carriage occur in FIG. 13A.

Figure 14A:
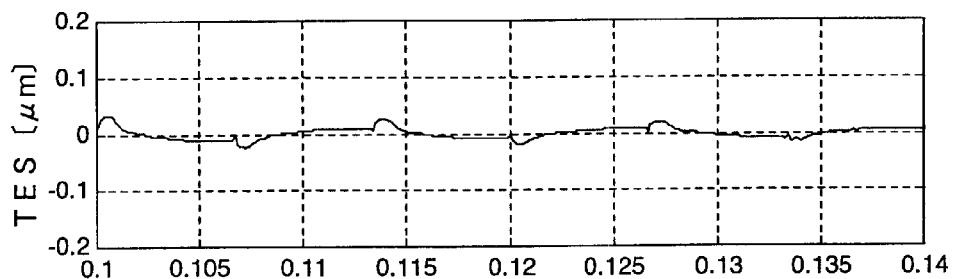
FIGS. 14A to 14D are waveform diagrams in which a learning halfway portion in FIGS. 12A to 12D is enlarged by a time base.
Figure 14B:
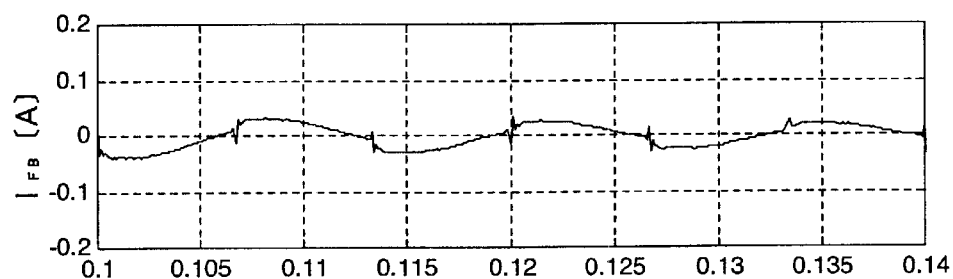
Figure 14C:
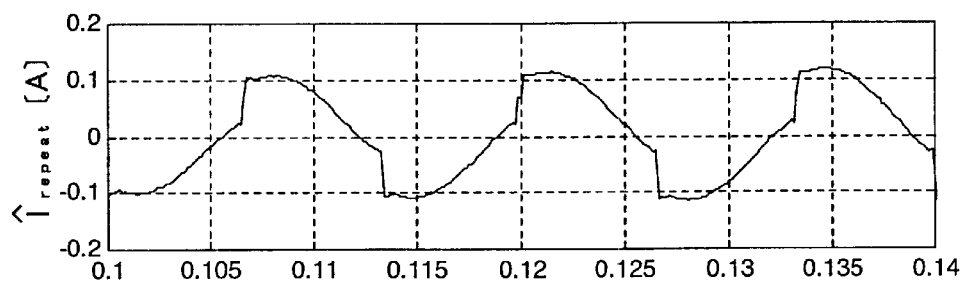
Figure 14D:
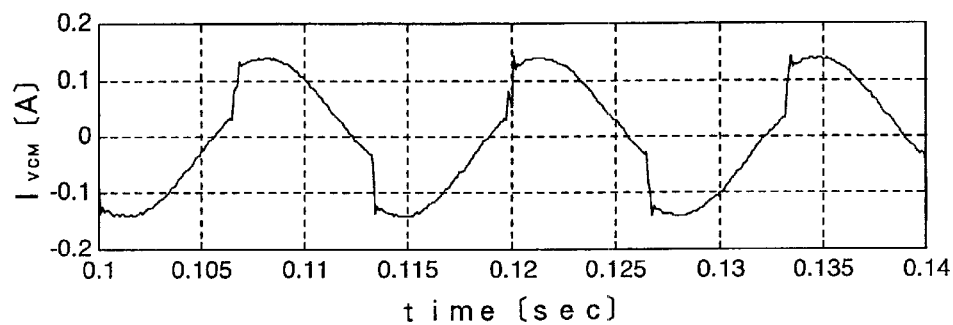
Figure 15A:
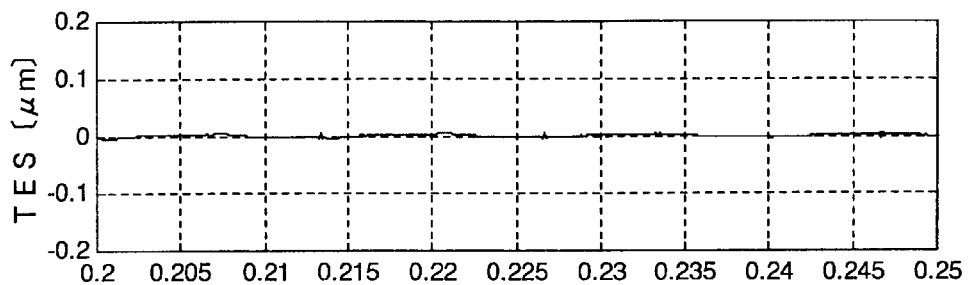
FIGS. 15A to 15D are waveform diagrams in which a learning end portion in FIGS. 12A to 12D is enlarged by a time base.
Figure 15B:
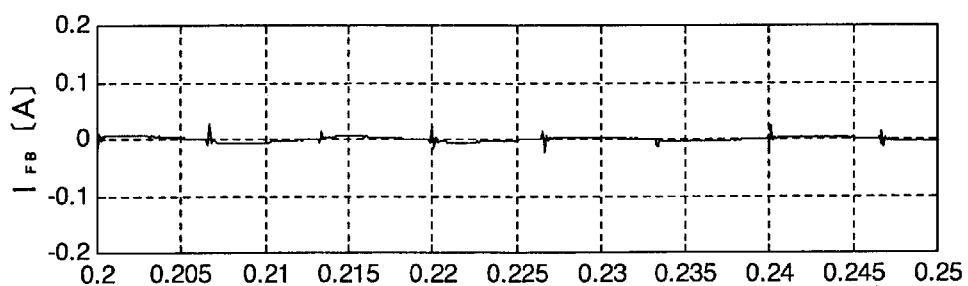
Figure 15C:
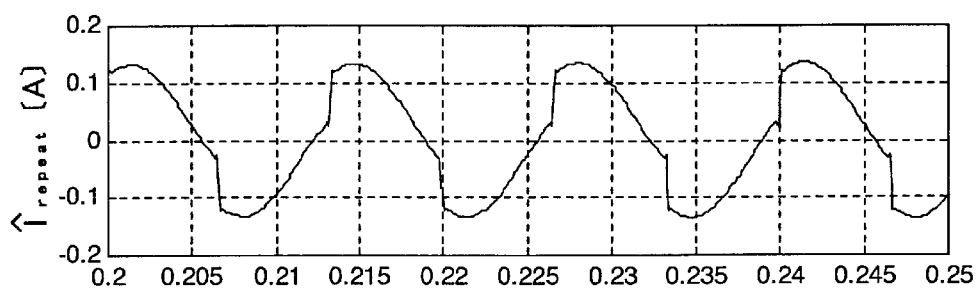
Figure 15D:
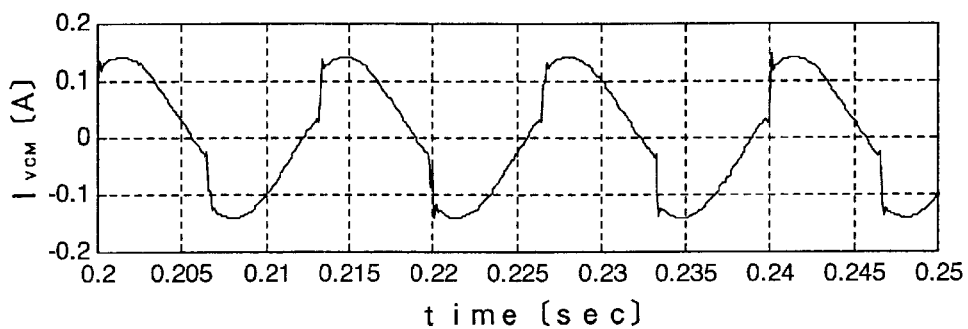

FIGS. 14A to 14D enlargedly show waveforms on the way of the learning within a time range from 0.1 to 0.14 sec in FIGS. 12A to 12D on the basis of the time base. In the waveforms on the way of the learning in FIGS. 14A to 14D, as compared with those at the start of the learning in FIGS. 13A to 13D, most of the disturbance component of the feedback control signal $I_{FB}$ in FIG. 14B is transferred into the learning control signal I^repeat in FIG. 14C as a learning result. Thus, the peak-like positional deviation due to the steep change of frictional disturbance of the tracking error signal TES in FIG. 14A is mostly suppressed. As a whole, the positional deviation due to the eccentricity is also mostly suppressed.

FIGS. 15A to 15D are waveform diagrams in which the waveforms near the learning end portion within a time range from 0.2 to 0.25 sec in FIGS. 13A to 13D are enlarged on the basis of the time base. In the waveforms at the end of the learning, the disturbance component is almost perfectly transferred into the learning control signal I^repeat in FIG. 15C and the disturbance of the tracking error signal TES in FIG. 15A serving as a feedback signal of the feedback control system is suppressed to a level such that it can be almost ignored.

Figures 16A, 16B, 16C:
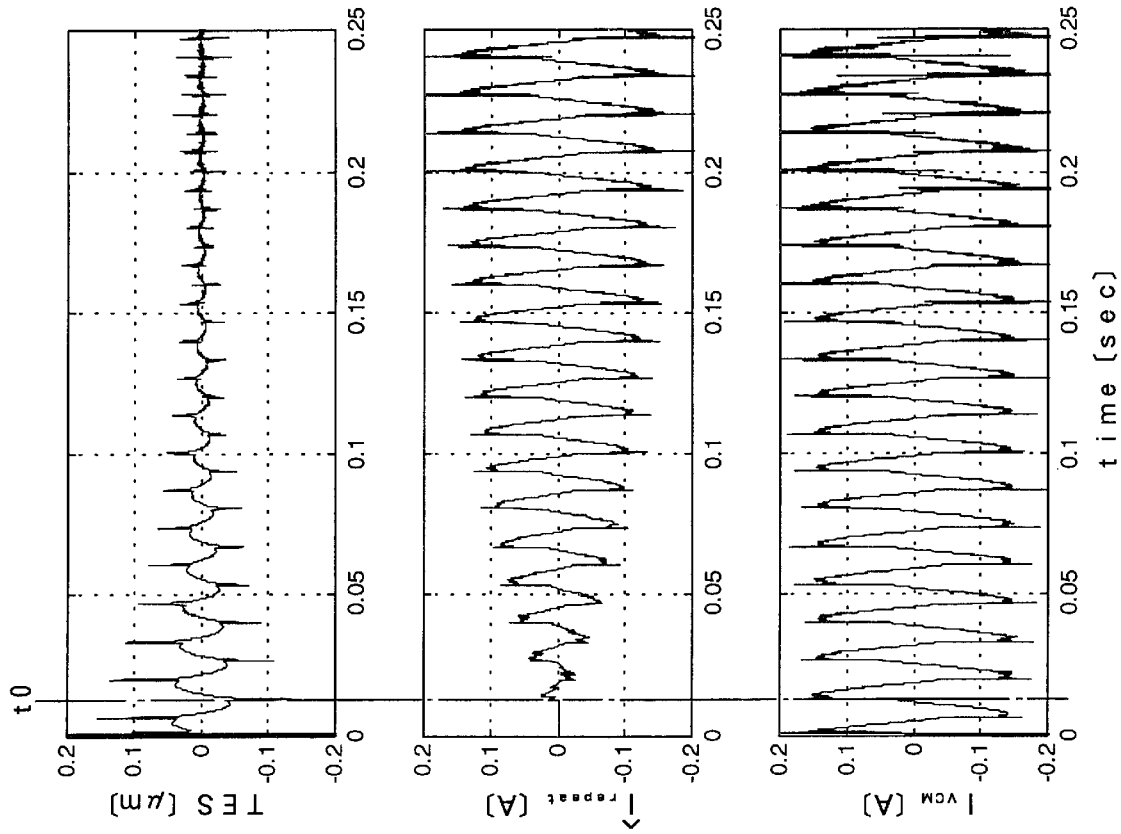
FIGS. 16A to 16C are waveform diagrams of the tracking error signal, learning control signal, and drive signal for a period of time from the start of the learning to the end thereof in the case where a time-lead compensation is not performed in the first embodiment in FIG. 6.
Figure 17A:
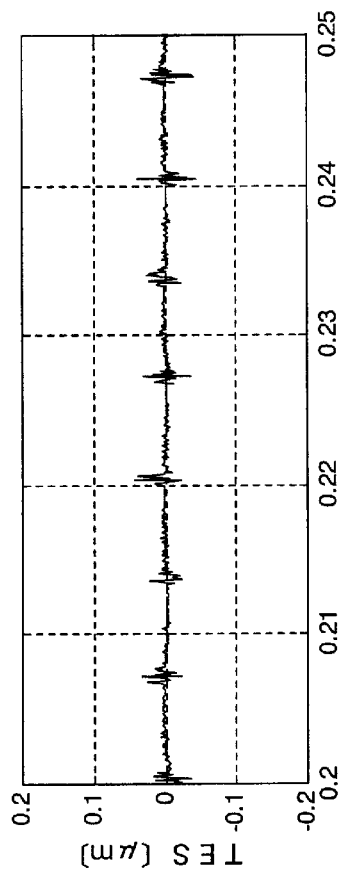
FIGS. 17A to 17C are waveform diagrams in which a learning end portion in FIGS. 16A to 16C is enlarged by a time base.
Figure 17B:
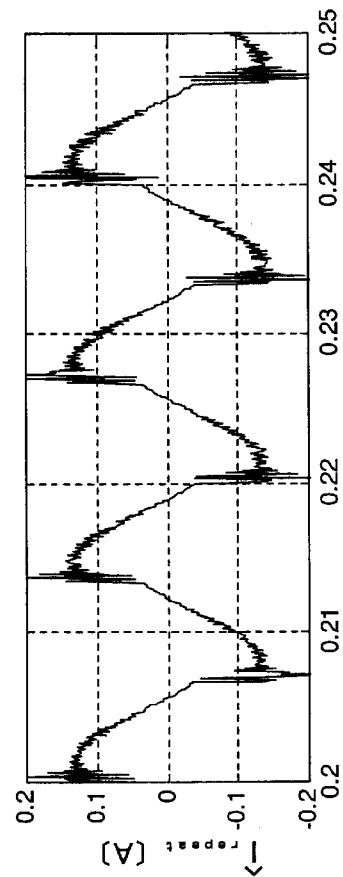
Figure 17C:
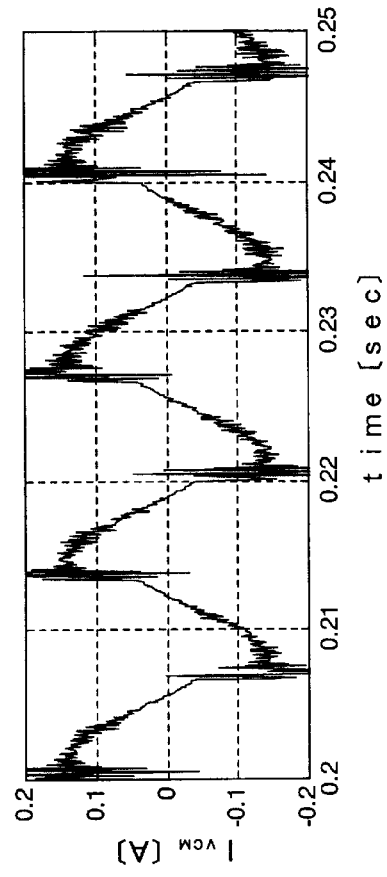

FIGS. 16A to 16C are waveforms of respective units in the learning process in the case where the compensation of the advanced time Δtlead to compensate the delay time of the feedback control system is not performed by the FF output unit 100 of the learning control unit 82 in FIG. 6. FIGS. 17A to 17C enlargedly show waveforms at the timing near the end of the learning within a time range from 0.2 to 0.25 sec in FIGS. 16A to 16C on the basis of the time base. The waveforms of the tracking error signal TES, learning control signal I^repeat, and carriage drive signal $I_{VCM}$ are shown here and the feedback control signal $I_{FB}$ is omitted. In the case where the compensation by the advanced time Δtlead is not performed, the memory cell to be updated by the learning law and the memory cell to be outputted as the learning result are the same, so that an output of the learning control signal I^repeat is obtained from the beginning at t0. As will be obviously understood from the waveforms of FIGS. 16A to 16C and 17A to 17C, if the process to advance the reading timing by the advanced time Δtlead to compensate the delay time of the feedback control system is not performed at the time of the feed-forward output, the response waveform becomes oscillatory by being influenced by the delay time of the feedback control system. Thus, the oscillatory component due to the delay is also transferred as a learning result into the learning control signal I^repeat which is outputted as a learning result in FIG. 17C at the learning end time point. It will be obviously understood that the enough disturbance component suppressing effect cannot be expected. On the other hand, good learning results as shown in FIGS. 12A to 15D are obtained by the output of the learning result by the setting of the advanced time corresponding to the delay time of the feedback control system in the FF output unit 100 in FIG. 6. In the case where the learning control unit 82 in FIG. 5 is provided between the feedback control unit 80 and carriage driving unit 86, since the feedback current itself which is outputted from the feedback control unit 80 to the carriage driving unit 86 is a learning target, the waveforms with a few noises can be learned. Since the learning result is the feedback current itself, there is an advantage such that it can be directly outputted as a feed-forward current to the feedback control system and used at the time of the seek control, on-track control, kickback control, or the like.

Figure 18:
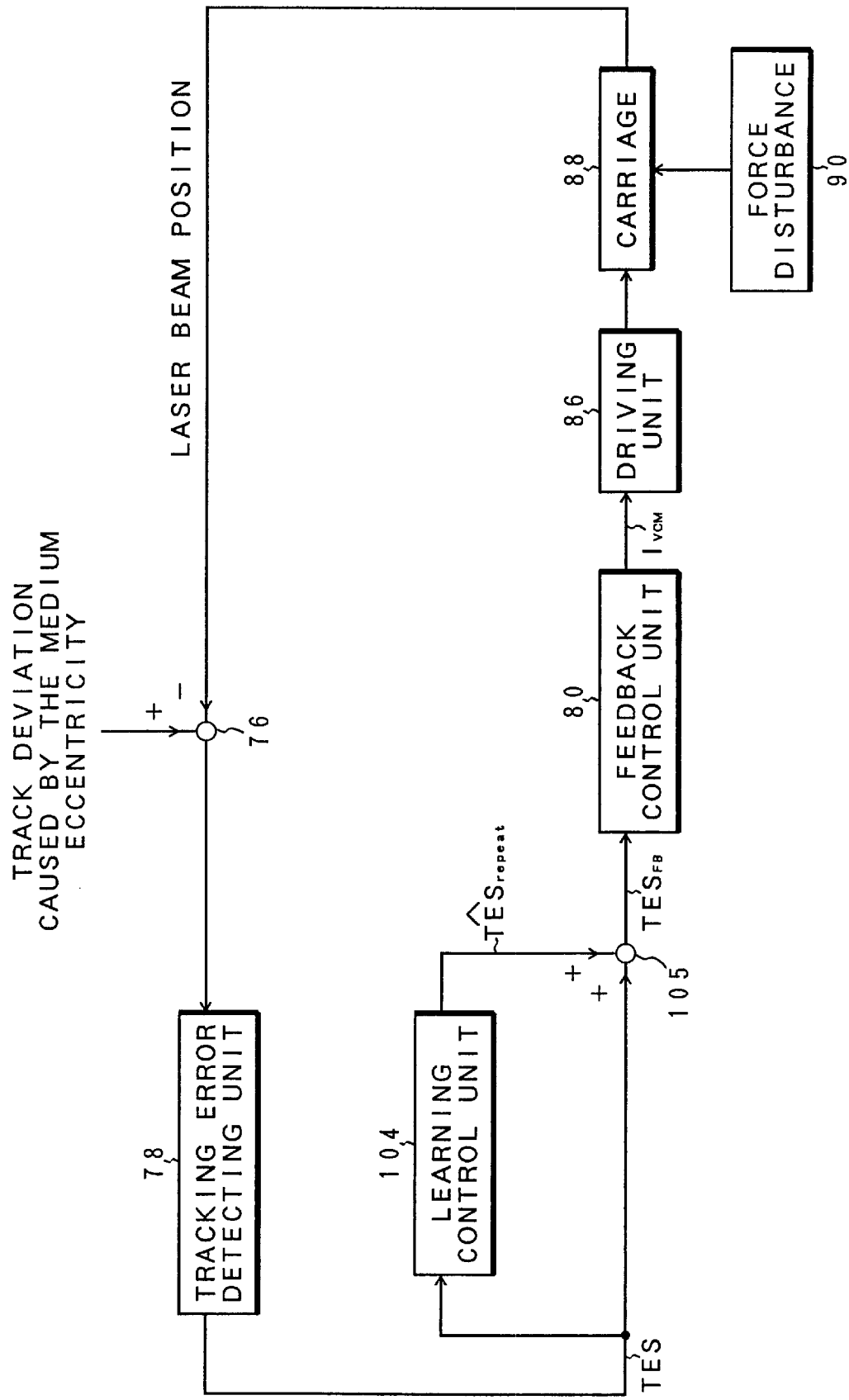
FIG. 18 is a block diagram of the second embodiment of the invention in which a learning control unit is provided between a tracking error detecting unit and a feedback control unit.

FIG. 18 shows the second embodiment of a positioning control of the head of the storage apparatus of the invention. The second embodiment is characterized in that the learning control unit is provided between a tracking error detecting unit and a feedback control unit. The feedback control section is constructed by the a tracking error detecting unit 78, feedback control unit 80, carriage driving unit 86, and carriage 88. As shown in FIG. 5, the tracking error detecting unit 78 optically detects and outputs the tracking error as a difference between the track position which is fluctuated by the eccentricity of the medium and the position of the laser beam. The force disturbance 90 such as a frictional disturbance which is inverted at the timing of the zero moving velocity in the reciprocating motion of the carriage in association with the eccentricity disturbance is applied to the carriage 88. With respect to such a feedback control system, in the second embodiment, a learning control unit 104 is provided between the tracking error detecting unit 78 and feedback control unit 80, and the tracking error signal TES from the tracking error detecting unit 78 is inputted to the learning control unit 104 and is subjected to the learning process. The learning tracking error signal TES^repeat obtained as a learning result is added to the tracking error signal TES from the tracking error detecting unit 78 by an addition point 105. A resultant addition signal is inputted as a feedback. signal $TES_{FB}$ to the feedback control unit 80.

FIG. 19 is a functional block diagram of the learning control unit 104 in FIG. 18. A fundamental construction other than the construction such that the tracking error signal TES is inputted and learned and the learned tracking error signal TES^repeat is outputted as a learning control signal, is the same as that of the first embodiment of FIG. 6. That is, the learning control unit 104 is constructed by the control unit 92, sample processing unit 94, approximated function calculating unit 96, ring buffer memory 98, and FF output unit 100. A cell address calculating unit to designate a cell position in the ring buffer memory 98 is provided in the control unit 92. According to a learning algorithm by the learning control unit 104 in FIG. 19, a time function for one rotation period of the medium is defined for the tracking error signal TES as a learning target in place of the periodic feedback current in the first embodiment shown in FIG. 7, and an approximated function TES^repeat(t) is similarly obtained as a set of the heights of the rectangular functions obtained by dividing the rotation period into N intervals. In the second embodiment, therefore, the approximated function which is approximated by the set of the heights of rectangular functions obtained by dividing the period $T_L$ for one medium rotation period into N intervals is as shown by the following equation.

$$\text{TES\^{}repeat}(t)=C_i \tag{7}$$

where, i=floor(t/T)
T=$T_L$/N
0≦t<$T_L$

The height $C_i$ of each rectangular function is calculated by the following equation.

$$\dot{C}_i=\text{Klearn}\cdot TES(t) \tag{8}$$

where, i=floor(t/T)
    $T=T_L/N$
    $0 \leq t < T_L$

In the actual apparatus, the sampling is performed a plural number of times for the time interval T of each rectangular function. Now, assuming that the sampling period is labelled to Tsample, a storage value for the memory cell in the ring buffer memory 98 in FIG. 19 is calculated by the following equation.

$$mem[i]=mem[i]+\text{Klearn}\cdot\text{Tsample}\cdot TES(t) \qquad (9)$$

where, i=floor(t/T)
    $T=T_L/N$
    $0 \leq t < T_L$

An address calculation to store the learning result into the corresponding memory cell in the ring buffer memory 98 is executed in accordance with the equation (4) in a manner similar to the case of the first embodiment. The cell address when the calculation result is outputted by the FF output unit 100 is obtained in accordance with the equation (6) by the lead time Δtlead in consideration of the delay time of the feedback control system in a manner similar to the first embodiment.

Figure 20A:
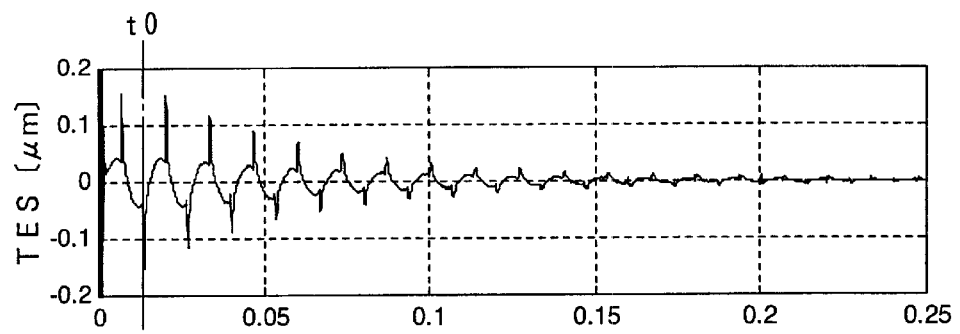
FIGS. 20A to 20D are waveform diagrams of a tracking error signal, a tracking error learning signal, a sum signal of the tracking error signal and the tracking error learning signal, and a drive signal for a period of time from the start of the learning to the end thereof according to the second embodiment in FIG. 18.
Figure 20B:
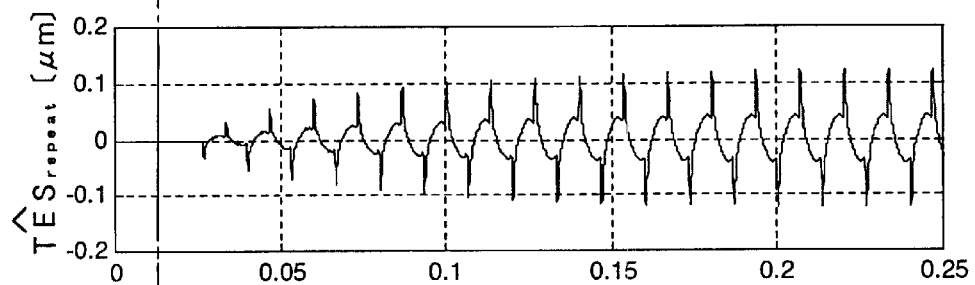
Figure 20C:
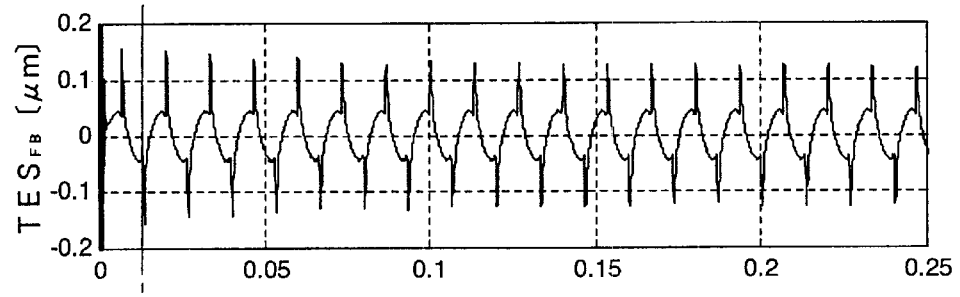
Figure 20D:
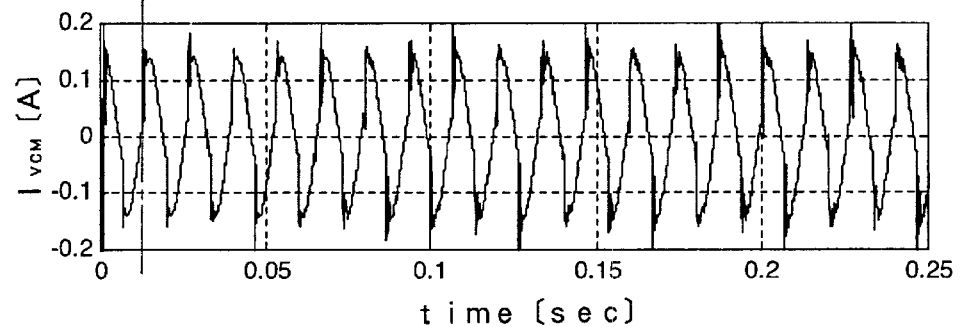
Figure 21A:
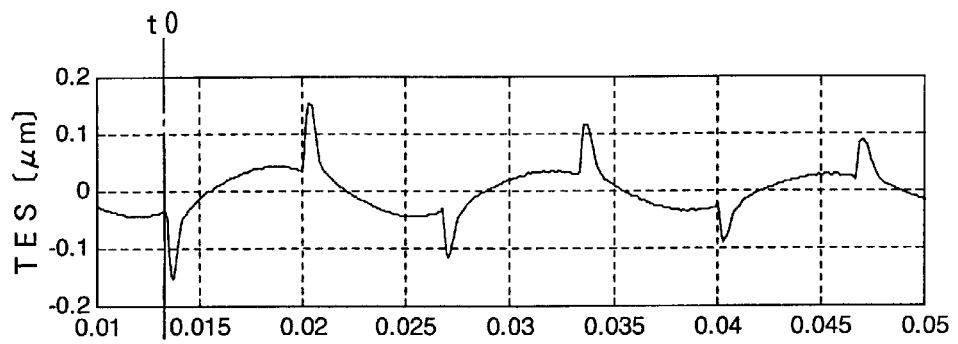
FIGS. 21A to 21D are waveform diagrams in which a learning start portion in FIGS. 20A to 20D is enlarged by a time base.
Figure 21B:
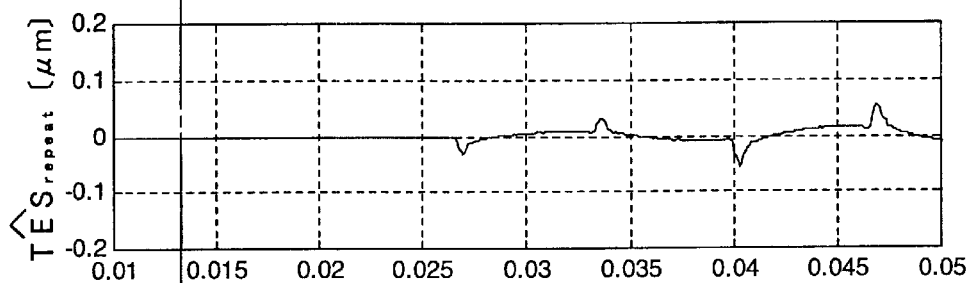
Figure 21C:
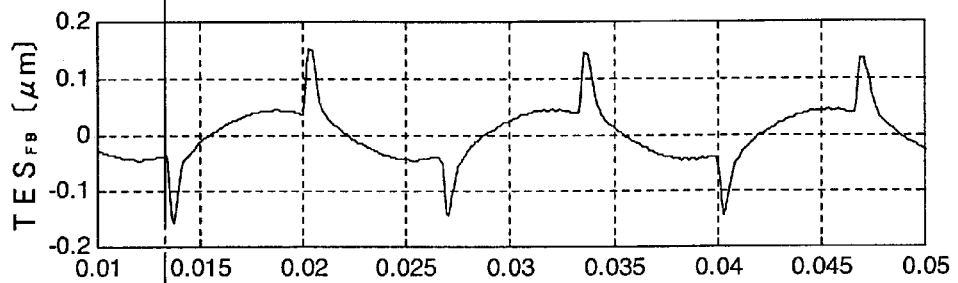
Figure 21D:
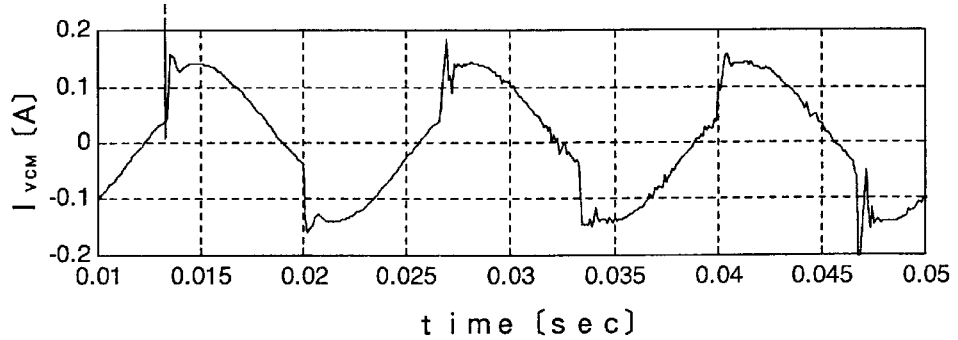

FIGS. 20A to 20D are signal waveforms of respective sections in the learning mode in the second embodiment to learn the tracking error signal TES in FIGS. 18 and 19. FIG. 20A shows the tracking error signal TES. FIG. 20B shows the learning tracking error signal TES^repeat which is outputted as a learning result. FIG. 20C shows the feedback signal $TES_{FB}$ serving as an input of the feedback control unit 80. FIG. 20D shows the carriage drive current $I_{VCM}$. In FIGS. 20A to 20D as well, the learning is started at time t0. Just after the start of the learning, the tracking error due to the eccentricity disturbance and the peak-like tracking error due to the steep change of the frictional disturbance in association with the zero moving velocity of the carriage are included in the tracking error signal TES in FIG. 20A. However, the disturbance component is transferred into the learning tracking error signal TES^repeat in FIG. 20B in association with the progress of the learning and the disturbance component of the tracking error signal TES is sufficiently suppressed at the end of the learning.

Figure 22A:
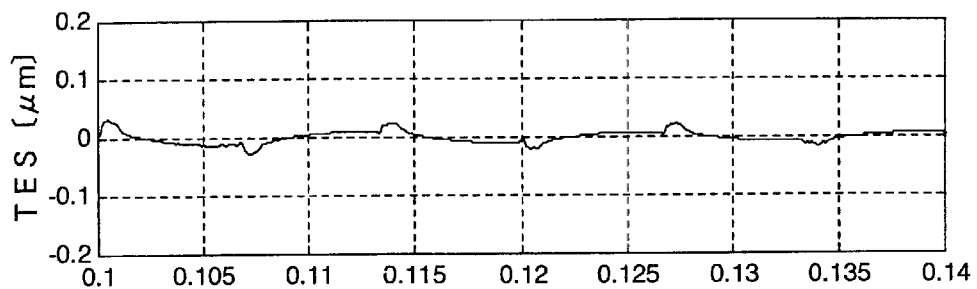
FIGS. 22A to 22D are waveform diagrams in which a learning halfway portion in FIGS. 20A to 20D is enlarged by a time base.
Figure 22B:
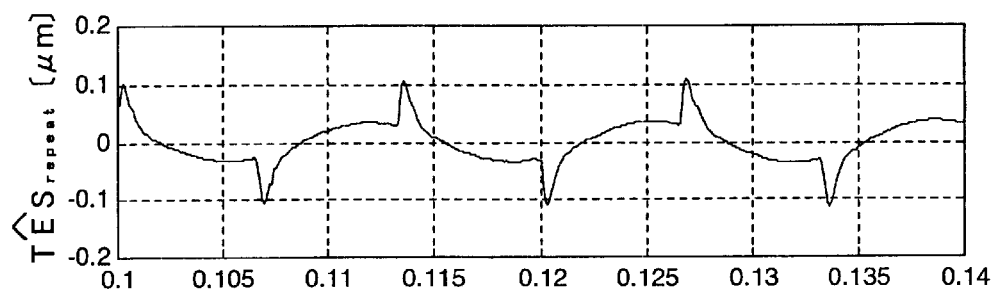
Figure 22C:
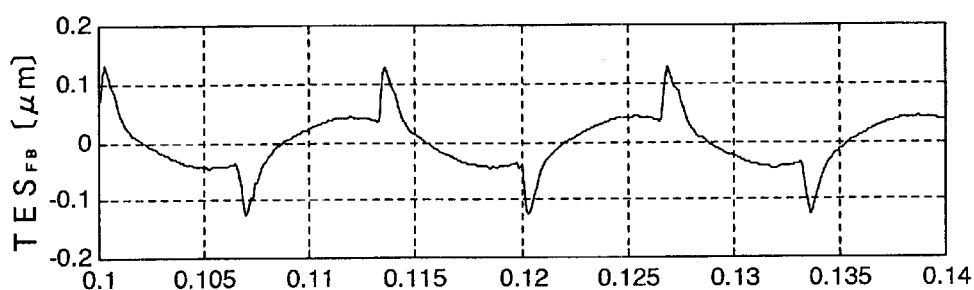
Figure 22D:
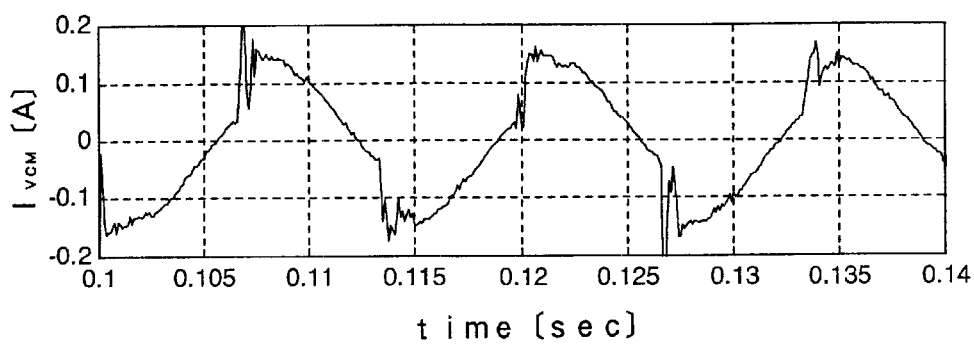

FIGS. 21A to 21D enlargedly show waveforms at the time near the start of the learning within a time range from 0.01 to 0.05 sec in FIGS. 20A to 20D on the basis of the time base. That is, the learning is started at time t0. Immediately after the start of the learning, the eccentricity disturbance and the peak-like frictional disturbance occurring at the timing of the zero moving velocity of the carriage are included in the tracking error signal TES in FIG. 22A. The advance compensation by the advanced time Δtlead to perform the delay compensation of the feedback control system is performed when the learning result is read out from the ring buffer memory 98 by the FF output unit 100 in FIG. 19.

FIGS. 22A to 22D enlargedly show the waveforms in respective sections on the way of the learning within a time range from 0.1 to 0.14 sec in FIG. 19 on the basis of the time base.

Figure 23A:
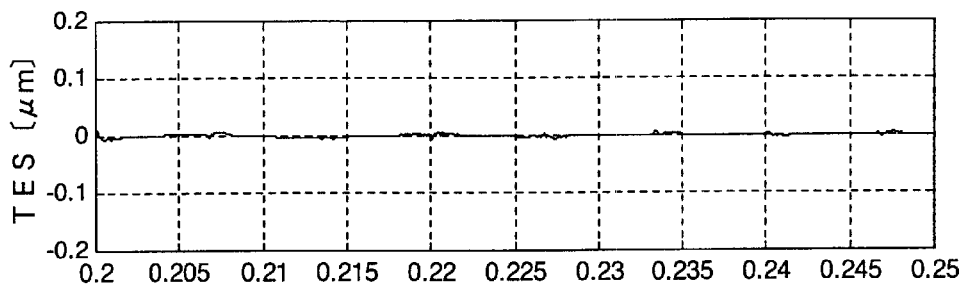
FIGS. 23A to 23D are waveform diagrams in which a learning end portion in FIGS. 20A to 20D is enlarged by a time base.
Figure 23B:
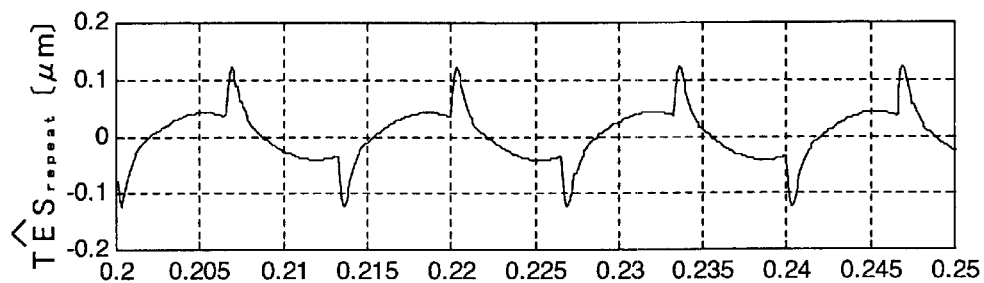
Figure 23C:
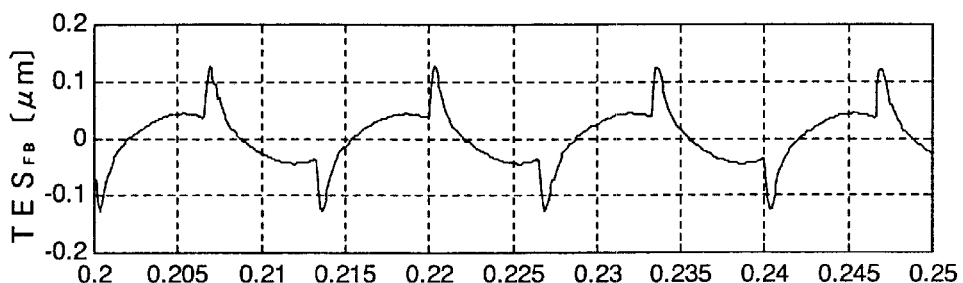
Figure 23D:
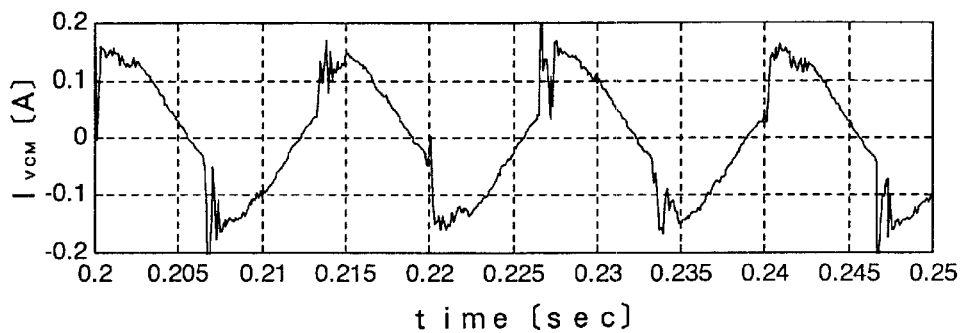

Further, FIGS. 23A to 23D enlargedly show waveforms at the time near the end of the learning within a time range from 0.2 to 0.25 sec in FIGS. 20A to 20D on the basis of the time base. In the waveforms near the end of the learning, almost all of the disturbance components included in the tracking error signal TES in FIG. 23A are transferred into the learning tracking error signal TES^repeat as a learning result of FIG. 23B, so that a control environment in which the disturbance due to the medium eccentricity does not exist in the feedback control system is formed.

Figure 24B:
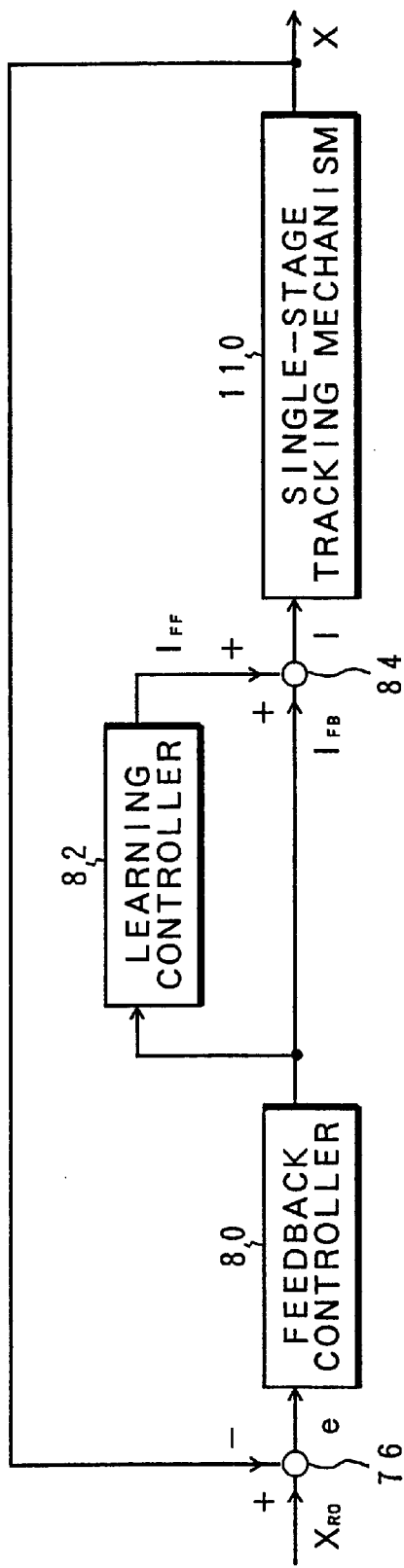

FIG. 24A shows a principle of an approximating method of an unknown function. FIG. 24B shows a constructional principle diagram of a control system according to the invention. The control system comprises the adder 76, feedback control unit 80, learning control unit 82, adder 84, and single-stage tracking mechanism 110. A solid bold line in FIG. 24A indicates an unknown VCM drive current signal Irepeat(t) which can suppress the repetitive disturbance synchronized to the disk rotation. The time t which is used in the diagram and the following equations (10) to (12) is the time synchronized to the disk rotation, and is reset to zero at a certain time in every rotation period of the disk. That is now assuming that $T_L$ denotes the disk rotation period, $0 \leq t < T_L$ is obtained.

Now, we try to express the approximated function I^repeat(t) of the unknown function Irepeat(t) by using a set of the heights of N rectangular functions.

$$\hat{I}\text{repeat}(t)=C_i \qquad (10)$$

where, i=floor(t/T)
    T : time width of each rectangular function (namely, $T=T_L/N$, and i is an integer of $0 \leq i \leq (N-1)$)

floor(x) is a function that rounds x to the nearest integer less than or equal to x. The height $C_i$ of each rectangular function is updated in real-time by a simple learning algorithm as shown by the following equation (11) by using the output $I_{FB}(t)$ of the feedback control unit 80 as a learning input.

$$\dot{c}_i = \begin{cases} k \cdot I_{FB}(t) & \text{if } iT \leq t < (i+1)T \\ 0 & \text{otherwise} \end{cases} \qquad (11)$$

where, k : constant learning gain

This learning algorithm has a function to change the height of each rectangular function in the direction that $I_{FB}(t)$ approaches toward zero.

Finally, the learning control unit 82 outputs the feedforward signal $I_{FF}(t)$ as follows.

$$I_{FF}(t) = \begin{cases} \hat{I}_{repeat}(t + \Delta t_{lead}) & \text{if } 0 \leq t < (T_L - \Delta t_{lead}) \\ \hat{I}_{repeat}(t + \Delta t_{lead} - T_L) & \text{if } (T_L - \Delta t_{lead}) \leq t < T_L \end{cases} \qquad (12)$$

where, Δtlead : constant lead time for stabilizing the learning convergence

The above principle of the invention can be explained as follows by further clearly expressing the definition of the rectangular function.

FIG. 24A shows the principle of the approximating method of an unknown function. FIG. 24B shows the constructional principle diagram of the control system according to the invention. The control system comprises the adder 76, feedback control unit 180, learning control unit 82, adder 84, and single-stage tracking mechanism 110. A solid bold line in FIG. 24A indicates an unknown VCM drive current signal Irepeat(t) which can suppress the repetitive disturbance synchronized to the disk rotation. The time t which is used in the diagram and the following equations (13) to (16) is the time synchronized to the disk rotation, and is reset to zero at a certain time in every rotation period of the disk. That is, now assuming that $T_L$ denotes the disk rotation period, $0 \leq t < T_L$ is obtained.

Now we try to express the approximated function Îrepeat(t) of the unknown function Irepeat(t) by using the sum of N rectangular functions by the following equation (13).

$$I_{repeat}(t) = \sum_{i=0}^{N-1} c_i \cdot \Pi_i(t) \quad (13)$$

where, $\Pi_i(t)$: rectangular function shown by the following equation (14)

$$\Pi_i(t) = \begin{cases} 1 & \text{if } iT \leq t < (i+1)T \\ 0 & \text{else} \end{cases} \quad (14)$$

where, T : time width of a range in which each rectangular function $\Pi_i(t)$ is equal to 1 (namely, T=$T_L$/N, and i is an integer of $0 \leq i \leq (N-1)$)

The height $C_i$ for each rectangular function is updated in real-time by a simple learning algorithm as shown by the following equation (15) by using the output $I_{FB}(t)$ of the feedback control unit 80 as a learning input.

$$\dot{C}_i = k \cdot \Pi_i(t) \cdot I_{FB}(t) \quad (15)$$

where, k : constant learning gain

This learning algorithm has a function to change the height of each rectangular function in the direction that $I_{FB}(t)$ approaches toward zero.

Finally, the learning control unit 82 outputs the feed-forward signal $I_{FF}(t)$ as follows.

$$I_{FF}(t) = \begin{cases} \hat{I}_{repeat}(t + \Delta t_{lead}) & \text{if } 0 \leq t < (T_L - \Delta t_{lead}) \\ \hat{I}_{repeat}(t + \Delta t_{lead} - T_L) & \text{if } (T_L - \Delta t_{lead}) \leq t < T_L \end{cases} \quad (16)$$

where, $\Delta$tlead : constant lead time for stabilizing the learning convergence The above two explanations are similar except for a mere difference between the numerical expressions. The substantial (industrial) meanings and contents are equivalent. For example, the equations (13) and (14) are obtained by more clearly expressing the equation (10), and the equation (15) shows the learning algorithm that is substantially equivalent to that of the equation (11).

According to the invention as mentioned above, with respect to the feedback control system of the head mechanism in which both the seek control of the coarse positioning precision and the track-following control of the fine positioning precision are executed by the same carriage movement, the learning control signal to suppress the disturbance component is obtained by the learning control of the feedback control signal or the tracking error signal. The eccentricity positional deviation, the peak-like tracking error due to the steep change of the frictional disturbance, and the like can be effectively suppressed by the feed-forward output for the feedback control system of the learning result obtained by the learning control without widening the band of the feedback control system. The control precision and response speeds of the feedback control system in the seek control and the track-following control can be remarkably improved.

Although the above embodiments have been shown and described with respect to the optical storage apparatus as an example, the invention incorporates a magnetic storage apparatus or apparatuses of other proper storing systems.

The invention is not limited to the foregoing embodiments but incorporates many proper modifications without departing from the objects and advantages of the invention. The invention is not limited by the numerical values of the above embodiments.

What is claimed is:

1. A storage apparatus comprising:
   a head which moves to an arbitrary track position on a medium;
   a position signal detecting unit for detecting and outputting a position signal according to a positional deviation amount at a position of said head while using a predetermined position of a track on the medium as a reference;
   a feedback calculating unit for calculating a control signal based on said position signal, to move said head so as to suppress said positional deviation amount to zero;
   a learning control unit for analyzing a signal indicative of said positional deviation amount to reduce said said positional deviation amount for a repetitive disturbance to zero by developing an approximation function by a learning algorithm, and storing said function, and producing an output signal based on said function, and
   a driving unit for driving said head so as to trace said track in response to said position signal, said control signal and said output signal of said learning control unit;
   wherein said learning control unit obtains the approximated function on the basis of set of heights ($c_i$) of N rectangular functions whose time widths are obtained by dividing time for one medium rotation period into N intervals, and wherein i is an index number from 0 to (N–1) and N is an integer number greater than 1.

2. An apparatus according to claim 1, wherein said head has a structure of a single-driving type control such that an objective lens is mounted on a carriage which is movable in the direction which transverses the tracks on the medium in a manner such that a focusing control can be freely performed and both a track-following control for allowing a laser beam to trace the tracks by the movement of said carriage and a seek control for moving the laser beam to an arbitrary track position are performed.

3. An apparatus according to claim 1, wherein said learning control unit is provided between said feedback calculating unit and the driving unit, and in the case where the period for one medium rotation period is set to $T_L$, a drive current function Irepeat (t) (where, $0 \leq t < T_L$; $T_L$ denotes times that is required for one medium rotation) which repeats for a period of time from a start time t=0 for one medium rotation period to an end time t=$T_L$ is obtained by the learning algorithm as an approximated function Îrepeat(t) (where, $0 \leq t < T_L$; $T_L$ denotes times that is required for one medium rotation).

4. An apparatus according to claim 3, wherein said learning control unit comprises:
   a memory having a plurality of memory cells each for storing the height $C_i$ of each rectangular function of each interval of said approximated function Îrepeat(t);
   a sampling unit for sampling a control signal $I_{FB}$ which is outputted from said feedback calculating unit;
   an approximated function calculating unit for obtaining the height $C_i$ of each rectangular function of said approximated function Îrepeat(t) stored in each memory cell of said memory by $$\dot{C}_i = \text{Klearn} \cdot I_{FB}(t)$$

where, $\dot{C}_i$ is an update of $C_i$ and i denotes a number of an interval which is determined by time t; $0 \leq i \leq (N-1)$ on the basis of the control signal $I_{FB}$ sampled by said sampling unit and a predetermined learning gain Klearn and updating said height $C_i$; and a feed-forward output unit for reading out the height $C_i$ of each rectangular function of said approximated function I^repeat(t) stored in said memory cell as a learning control signal synchronously with a divisional period T of said medium rotation, adding said $C_i$ to the control signal $I_{FB}$ from feedback calculating unit, and supplying a drive signal $I_{VCM}$ to said driving unit, and at the time of storing the learning control signals, said memory, said sampling unit, said approximated function calculating unit, and said feed-forward output unit are controlled synchronously with said medium rotation.

5. An apparatus according to claim 4, wherein said sampling unit samples the control signal $I_{FB}$ at a predetermined period Tsample shorter than a divisional period T, said approximated function calculating unit obtains the height $C_i$ of each rectangular function of said approximated function I^repeat(t) stored in each memory cell in said memory by $$\dot{C}_i = \text{Klearn} \cdot I_{FB}(t)$$

where, $\dot{C}_i$ is an update of $C_i$ and i indicates the number of the interval which is determined by the time t; $0 \leq i \leq (N-1)$ on the basis of the control signal $I_{FB}$ sampled by said sampling unit and the predetermined learning gain Klearn at every said sampling period Tsample, and said feed-forward output unit reads out the height $C_i$ of each rectangular function of said approximated function I^repeat(t) stored in said memory cell synchronously with the medium rotation at every sampling period Tsample, adds said $C_i$ to the control signal $I_{FB}$ from said feedback calculating unit, and supplied a drive signal $I_{VCM}$ to said driving unit.

6. An apparatus according to claim 4, wherein said feed-forward output unit reads out a value for time which is advanced by a predetermined time Δtlead of said approximated function I^repeat(t) stored in each memory cell of said memory and outputs said value.

7. An apparatus according to claim 1, wherein said learning control unit is provide between said position signal detecting unit and said feedback calculating unit, and in the case where the period for one medium rotation period is set to $T_L$, a position function TESrepeat(t) (where, $0 \leq t < T_L$; $T_L$ denotes times that is required for one medium rotation period) which repeats for a period of time from a start time t=0 for one medium rotation period to an end time t=$T_L$ is obtained by the learning algorithm as an approximated function TES^repeat(t) (where, $0 \leq t < T_L$; $T_L$ denotes times that is required for one medium rotation period) which is approximately resumed by a set of the heights $C_i$ (where, i denotes an interval number; $0 \leq i \leq (N-1)$) of N rectangular functions whose time widths are obtained by dividing the period $T_L$ for one medium rotation period into N intervals.

8. An apparatus according to claim 1, wherein said learning control unit develops said approximated function by using said learning algorithm at a specific timing for a specific time and, after development, said learning control unit outputs said obtained approximated function synchronously with the medium rotation as a feed-forward compensation signal.

9. An apparatus according to claim 8, wherein said learning control unit feed-forward controls such that a learning operation to obtain said approximated function by said learning algorithm is executed for a specific time at a timing just after said medium was inserted into said apparatus and, at the time of a track-following control after development of the approximated function, said obtained approximated function is outputted synchronously with the medium rotation and a repetitive disturbance is removed.

10. An apparatus according to claim 8, wherein said learning control unit feed-forward controls such that at the time of a track jump and a seek control after development of the approximated function, said obtained approximated function is outputted synchronously with the medium rotation and the repetitive disturbance is removed.

11. An apparatus according to claim 8 or 10, wherein said at the time of development of said approximated function, said learning control unit executes the development operation of the approximated function for each location at a plurality of locations at a disk radial direction position, and at the time of a feed-forward after said development of a plurality of said approximated functions, the learning control unit selects related approximated functions to be used in accordance with the radial direction position at that time and performs a feed-forward.

12. An apparatus according to claim 11, wherein when the approximated function which has already been obtained at another location exists with respect to the approximated function getting operation at a plurality of locations, said learning control unit applies the learning algorithm by using data of said already existing approximated function as an initial value.

\* \* \* \* \*

UNITED STATES PATENT AND TRADEMARK OFFICE
CERTIFICATE OF CORRECTION

PATENT NO. : 6,628,579 B2
DATED : September 30, 2003
INVENTOR(S) : Watanabe et al.

It is certified that error appears in the above-identified patent and that said Letters Patent is hereby corrected as shown below:

<u>Column 24,</u>
Line 13, replace "the" with -- said --.
Line 22, delete "and" before "storing".
Line 51, replace "provide" with -- provided --.

<u>Column 26,</u>
Lines 7-11, delete "which is approximately resumed by a set of the heights $C_i$ (where, i denotes an interval number; $0 \leqq i \leqq (N-1)$) of N rectangular functions whose time widths are obtained by dividing the period $T_L$ for one medium rotation period into N intervals".

Signed and Sealed this

Eighth Day of June, 2004

JON W. DUDAS
*Acting Director of the United States Patent and Trademark Office*